United States Patent [19]

Sasaki et al.

[11] Patent Number: 5,040,204
[45] Date of Patent: Aug. 13, 1991

[54] CORDLESS TELEPHONE APPARATUS

[75] Inventors: Isao Sasaki, Hachioji; Koichi Ito, Hino, both of Japan

[73] Assignee: Kabushiki Kaisha Toshiba, Kawasaki, Japan

[21] Appl. No.: 103,737

[22] Filed: Oct. 2, 1987

[30] Foreign Application Priority Data

Oct. 6, 1986 [JP] Japan .................................. 61-237624

[51] Int. Cl.⁵ .............................................. H04Q 7/04
[52] U.S. Cl. ...................................... 379/61; 379/57; 379/58
[58] Field of Search ............................... 379/56-62; 455/33, 54, 56

[56] References Cited

U.S. PATENT DOCUMENTS

| | | | |
|---|---|---|---|
| 3,955,140 | 5/1976 | Stephens et al. | 325/4 |
| 4,056,780 | 11/1977 | Faulkner | 455/18 |
| 4,485,486 | 11/1984 | Webb et al. | 455/33 |
| 4,658,416 | 4/1987 | Tanaka | 379/59 |
| 4,661,972 | 4/1987 | Kai | 379/57 |
| 4,682,351 | 7/1987 | Makino | 379/61 |
| 4,700,375 | 10/1987 | Reed | 379/61 |
| 4,741,019 | 4/1988 | Takehashi | 379/61 |
| 4,761,806 | 8/1988 | Toki | 379/61 |

FOREIGN PATENT DOCUMENTS

| | | |
|---|---|---|
| 193316 | 9/1986 | European Pat. Off. . |
| 212761 | 3/1987 | European Pat. Off. . |
| 0024335 | 2/1986 | Japan ......................... 379/63 |

OTHER PUBLICATIONS

Patent Abstracts of Japan, vol. 9, No. 244 (E-346) (1967) 9/30/85.
Patent Abstracts of Japan, vol. 9, No. 47 (E-299) (1970) 2/07/85.
Patent Abstracts of Japan, vol. 10, No. 150 (E-408) (2207) 5/31/86.
Patent Abstracts of Japan, vol. 10, No. 125 (E-402) (2182) 5/10/86.

*Primary Examiner*—Robert Lev
*Attorney, Agent, or Firm*—Finnegan, Henderson, Farabow, Garrett and Dunner

[57] ABSTRACT

A cordess telephone apparatus with a paper reporting an incoming signal from a parent device or a radio telephone. When the parent device receives a calling signal from a subscriber's line or when a switch is operated at the parent device or the radio telephone, the pager is started by a signal delivered via a radio circuit from the parent device or the radio telephone. The pager is mounted removably on the radio telephone.

22 Claims, 20 Drawing Sheets

CORDLESS TELEPHONE APPARATUS

BACKGROUND OF THE INVENTION

1. Field of the Invention

This invention relates to a cordless telephone apparatus, and particularly to a cordless telephone apparatus which has a pager which reports an incoming call from a parent device or a radio telephone.

2. Description of the Related Art

Conventionally, an apparatus of this type has a structure, for example, shown in FIG. 13 in which a parent device 1 is connected via a radio channel with a radio telephone 2 and also connected with a subscriber's line 3.

When the apparatus received a calling signal from the subscriber's line 3, it provides the control shown in a flowchart of FIG. 14. First, at the parent device 1, the calling signal is input via a hybrid circuit 4 to a calling signal detector (not shown) which then detects it and delivers its detection output to a control circuit 5. When the control circuit 5 receives this detection output, it determines that there is an incoming call (step 101) and sets a synthesizer 6 at the frequency of a control channel. The control circuit 5 indicates an empty communication channel and applies the incoming signal, inclusive of an identification signal ID, to a transmitter 7 to thereby cause the transmitter 7 set in the control channel to transmit the incoming signal via a transmission antenna 8 (step 102).

On the other hand, in the radio telephone 2, a synthesizer 10 is set at the frequency of the control channel. To save the battery, the synthesizer 10 and a receiver 11 are turned on for a time t1 (step 201), and then turned off for a time t2 (step 202), which is repeated. When the receiver 11 is on and receives the incoming signal via a reception antenna 12 (step 203), it delivers this signal to an identification signal detector 13 and a reception field detector 14. When the identification signal detector 13 identifies an identification (ID) signal contained in the incoming signal and the reception field detector 14 detects the presence of a reception field, the control circuit 15 turns on a transmitter 16 (step 204). The control circuit 15 applies a signal responsive to an incoming signal, inclusive of the ID signal, to the transmitter 16 to cause same to transmit the responsive signal via a transmission antenna 17 (step 205). Thereafter, the control circuit 15 switches the synthesizer 10 from the frequency of the control channel to the frequency of the telephonic communication channel (step 206). When the receiver 18 in the parent device 1 receives the responsive signal via its reception antenna 19, it delivers the responsive signal to the identification signal detector 20 and reception field detector 21. When the detector 21 detects a reception field (step 103), the control circuit 5 causes the transmission of the incoming signal from being stopped (step 104). When no reception field is detected at the step 103, the control circuit 5 causes the incoming signal to be transmitted repeatedly and when the number of transmissions reaches n (step 105), the control circuit 5 causes the transmission of the incoming signal to be stopped in order to avoid the unnecessary use of the control channel. If at this time the calling signal continues to be still transmitted (step 106), a sounder (not shown) of the parent device 1 is rung (step 107). On the other hand, when the identification signal detector 20 identifies the ID signal contained in the incoming signal (step 108), the control circuit switches the synthesizer 6 from the frequency of the control channel to the frequency of an empty telephonic communication channel (step 109). When no ID signal is identified at the step 108, the control circuit 5 waits until it fails to receive a calling signal from the telephone circuit 3 (step 110).

Then, the control circuit 5 delivers a bell ringing signal to the transmitter 7 set to the telephonic communication channel to cause the transmitter to transmit the bell ringing signal via the transmission antenna 8 (step 111). When the receiver 11 in the radio telephone 2 receives this signal via the reception antenna 12 (step 201), it delivers the signal to the control circuit 15 which, in response to this signal, rings a sounder 23 (step 208). At this time, the control circuit 15 determines whether or not the hook switch, not shown, is switched on (step 209), and if the hook switch is on, the control circuit 15 causes the transmitter 16 to transmit a signal indicative of the unhooking via the transmission antenna 17 (step 210). Thereafter, a radio telephone 2 is brought to a telephonic communication state (step 211), so that telephonic communication is possible over a telephone receiver 24 and a telephone transmitter 25. When the receiver 18 in the parent device 1 receives the unhooking signal via the reception antenna 19 (step 112), it delivers this signal to the control circuit 5 which, in response to this signal, causes the transmission of the bell ringing signal to be stopped (step 113). This causes the parent device 1 to be also put to a telephonic communication state (step 114).

In the cordless telephone apparatus, the telephonic communication channel has a wide baseband zone, for example, of 3 KHz, to permit vocal transmission and requires a high field strength, for example, of 40 dB uV/m or more to maintain high S/N. The service area for the cordless telephone apparatus, however, is limited to a relatively narrow range, for example, of 20 meters. Thus, when the radio telephone is outside the service area, it cannot receive a bell ringing signal transmitted via the telephonic communication channel even if there is the incoming signal, and cannot sometimes notice that it is being called. In order to avoid this, the transmission output power could be increased so as to expand the service area, which, however, would undesirably increase the current consumption at the radio telephone to shorten the battery life and easily interfere with other cordless telephone apparatuses. In order to reduce the current consumed when the radio telephone is waiting for an incoming signal, the power source of the radio telephone is switched off and the parent device rings a calling sound. When the radio telephone becomes distant from the parent device, however the user cannot hear the calling sound.

The radio telephone is usually too large and weighty to carry. The radio telephone could be miniaturized, which would, however, increase the cost as well as require miniaturization of the batteries used to thereby shorten the battery life. This requires the antenna to be miniaturized, which undesirably reduces the gain of the antenna and hence the service area.

As just described above, in the conventional cordless telephone apparatus, when there is an incoming signal or call at the radio telephone and the radio telephone is outside the service area for the telephonic communication channel, the radio telephone cannot receive a bell ringing signal, so that it cannot determine that it is being called. In addition, the radio telephone is large-sized and weighty, so that it is poorly suited for portability and is not functional.

OBJECT AND SUMMARY OF THE INVENTION

It is therefore an object of this invention to provide a cordless telephone apparatus which has a wide service area and is highly functional.

The cordless telephone apparatus according to this invention includes a pager which is started by a signal delivered via a radio channel from a parent device or radio telephone.

According to this invention, if there is an incoming call signal or call at the pager, the pager is started by a signal delivered via a radio channel from the parent or the radio telephone.

DESCRIPTION OF THE PREFERRED EMBODIMENT

Embodiments of this invention will now be described in detail with reference to the accompanying drawings.

Figure 1:
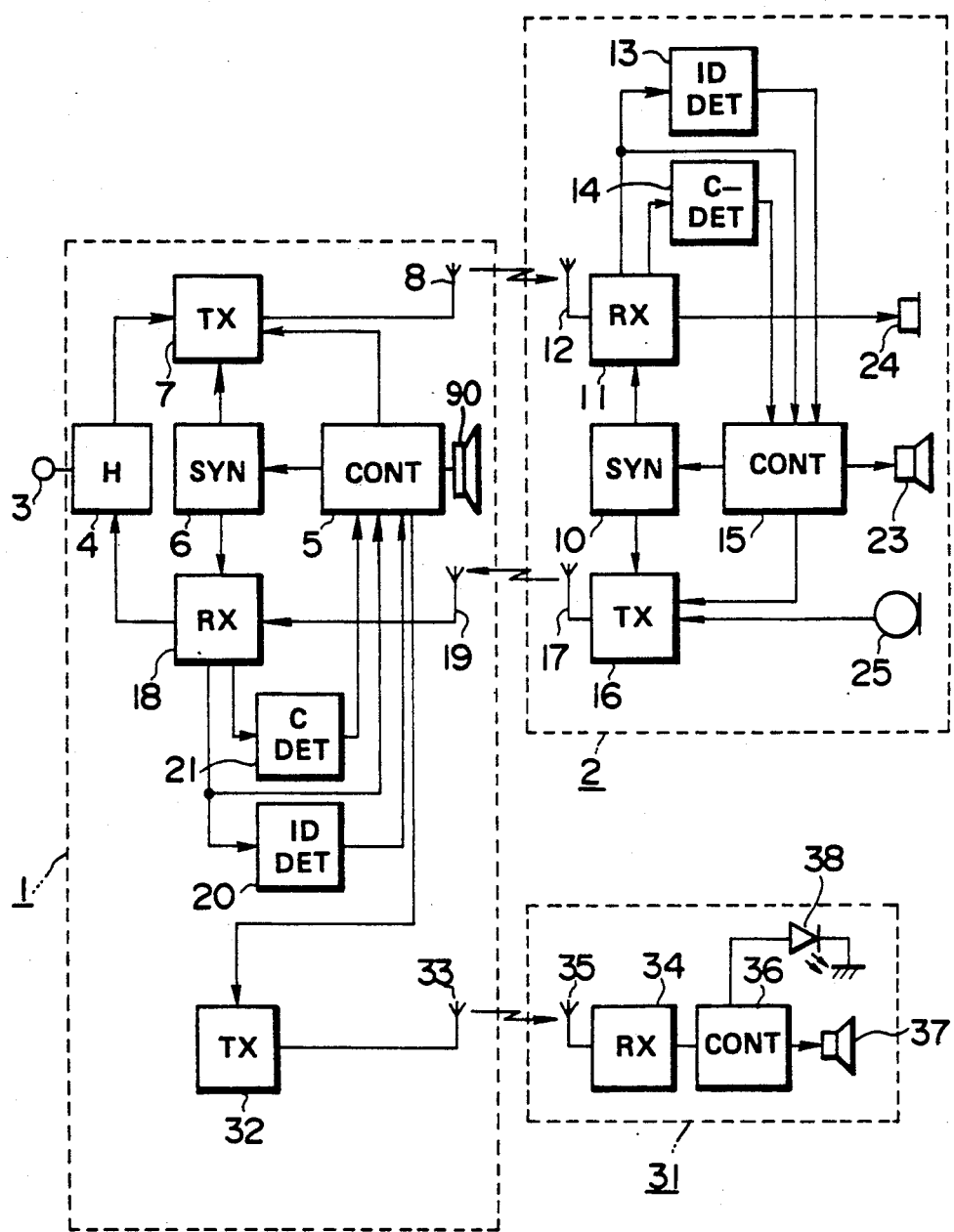
FIG. 1 is a block diagram showing a first embodiment of a cordless telephone apparatus according to this invention.

FIG. 1 is a block diagram showing a first embodiment of a cordless telephone apparatus according to this invention. This embodiment includes a modification of the conventional apparatus shown in FIG. 13 obtained by providing a pager 31, connecting a pager transmitter 32 with the control circuit 5 of the parent device 1, and providing a pager transmission antenna 33 to the pager transmitter 32. The pager 31 is also called a pocket bell and is small-sized, easy to carry and used only for reporting using alarm sound or light flashing.

Figure 2:
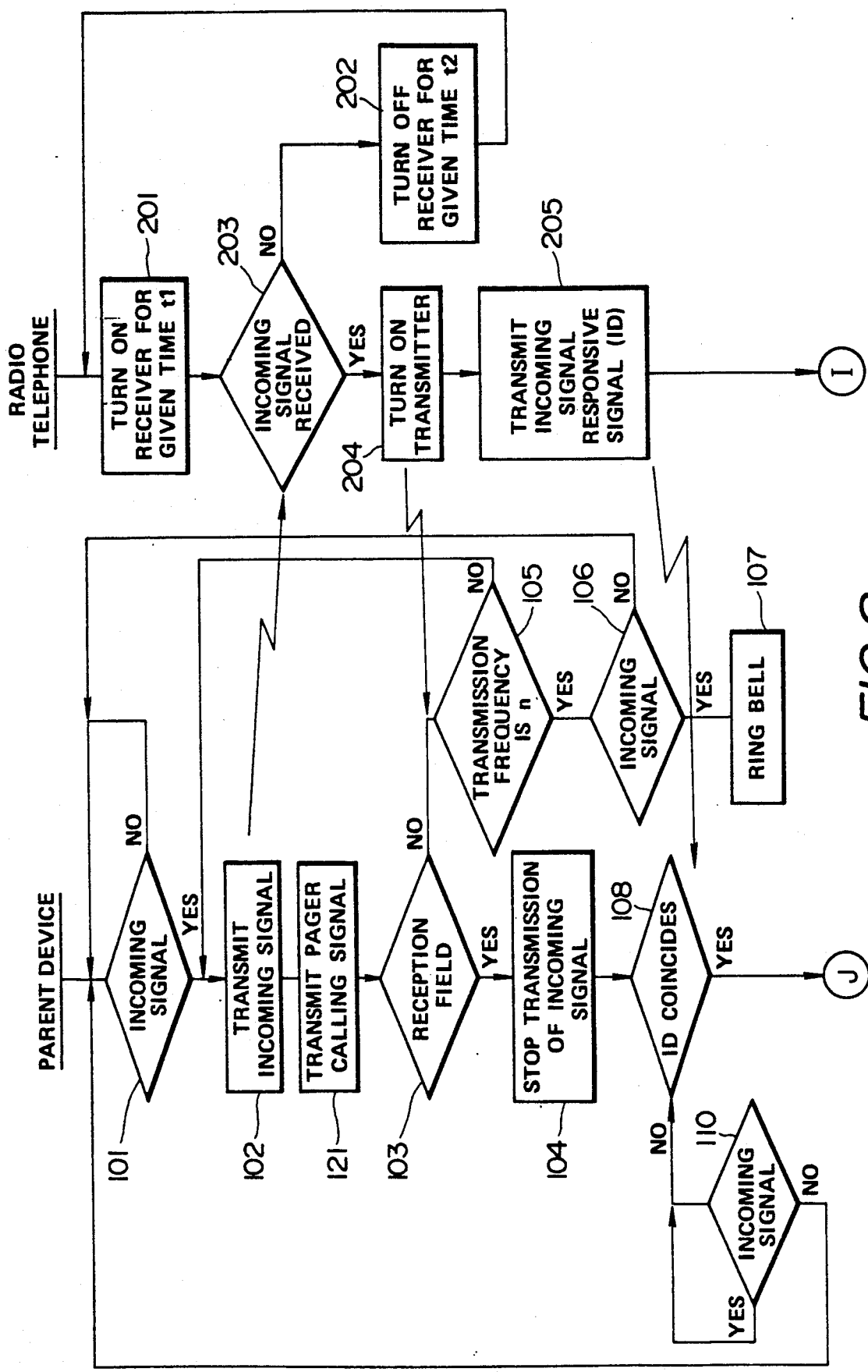
FIG. 2 is a flowchart showing the control process at the apparatus in FIG. 1.
Figure 2:
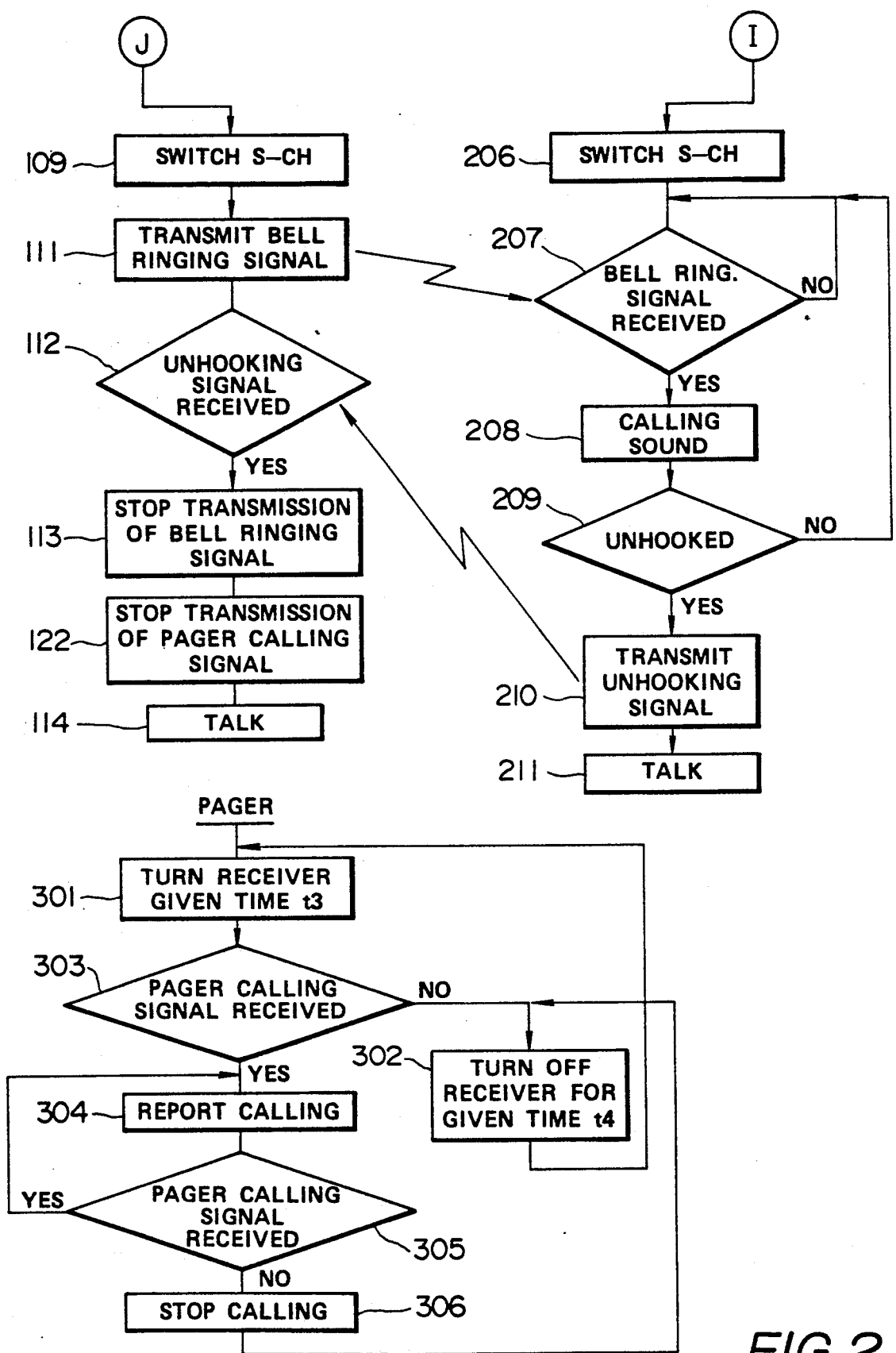

In this apparatus of this embodiment, when an incoming signal is received and a calling signal is delivered via the subscriber's line 3, the control shown in the flowchart of FIG. 2 is provided. First, when the incoming call signal is detected by a call signal detector, not shown, in the parent device 1, the control circuit 5 determines that there is an incoming signal (step 101), and causes the transmitter 7 to transmit the incoming signal via the transmission antenna 8 (step 102) and delivers a pager calling signal to the pager transmitter 32. When the pager transmitter 32 receives this signal, it transmits the signal via a preset pager channel and a pager transmission antenna 33 (step 121).

On the other hand, in order to save the battery energy, the pager 31 turns on the receiver 34 for a time t3 (step 301) and then turns off the receiver for a time t4 (step 302), which is repeated. The receiver 34 is set in advance in the pager channel. When the receiver 34 is on and receives the pager calling signal via the reception antenna 35 (step 303), it delivers this signal to the control circuit 36 which, in response to this signal, delivers a reporting vocal signal to a sounder 37 to cause same to ring as well as to cause an electric current to flow intermittently through a light emitting diode 38 to flash same. Therefore, the pager 31 reports a call from the parent device 1 (step 304).

At this time, an incoming signal is noticed at the radio telephone 2 from the reporting by the pager 31 or the ringing of the telephone sounder 23, and if the telephone 2 is unhooked (step 209), a signal indicative of this unhooking is transmitted (step 210). When the parent device 1 receives this signal, the control circuit 5 causes the transmission of a bell ringing signal to be stopped (step 112) and causes the transmission of the pager calling signal from the pager transmitter 32 to be stopped (step 122). At this time, the pager 31 fails to receive the pager calling signal (step 305) and stops a report showing the call from the patent device 1 (step 306).

In such an apparatus, the pager channel connecting the parent device 1 and pager 31 only carries the pager calling signal, so that it may be of a narrow zone and hence can carry the pager calling signal to a distant pager 31 even if the transmission power output from the parent device 1 is small. The pager 31 is used only in the pager channel, so that it may be simple in structure, low in power consumption and easy to miniaturized. Therefore, if the user carries the pager 31 around, he can easily notice an incoming signal, if any, even if he is distant from the parent device 1. Preferably, a switch is provided at the pager 31 to stop pager's reporting so as to avoid an unnecessary operation of the sounder 37 and light emitting diode 38

Figure 3:
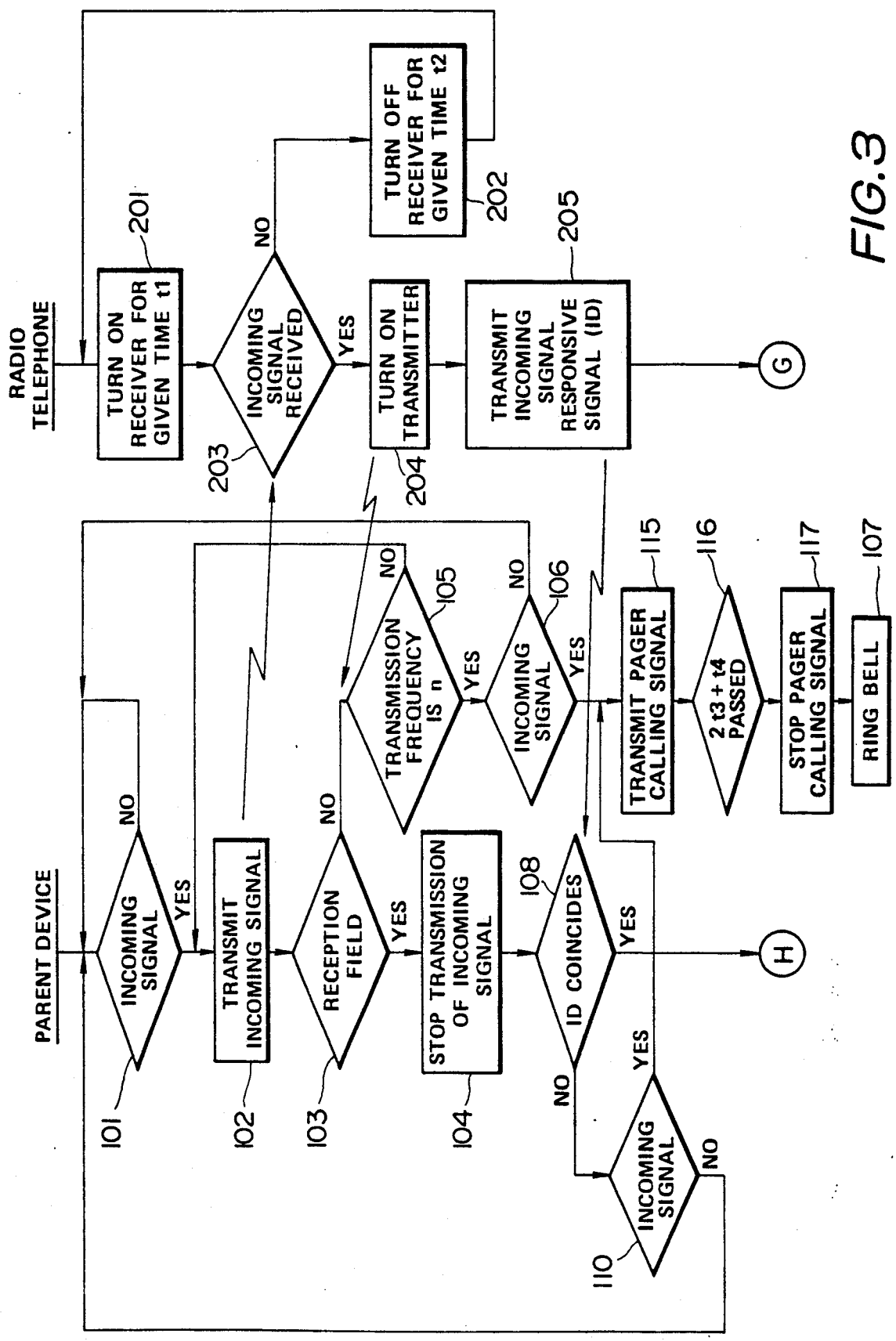
FIG. 3 is a flowchart showing another control process at the apparatus in FIG. 1.
Figure 3:
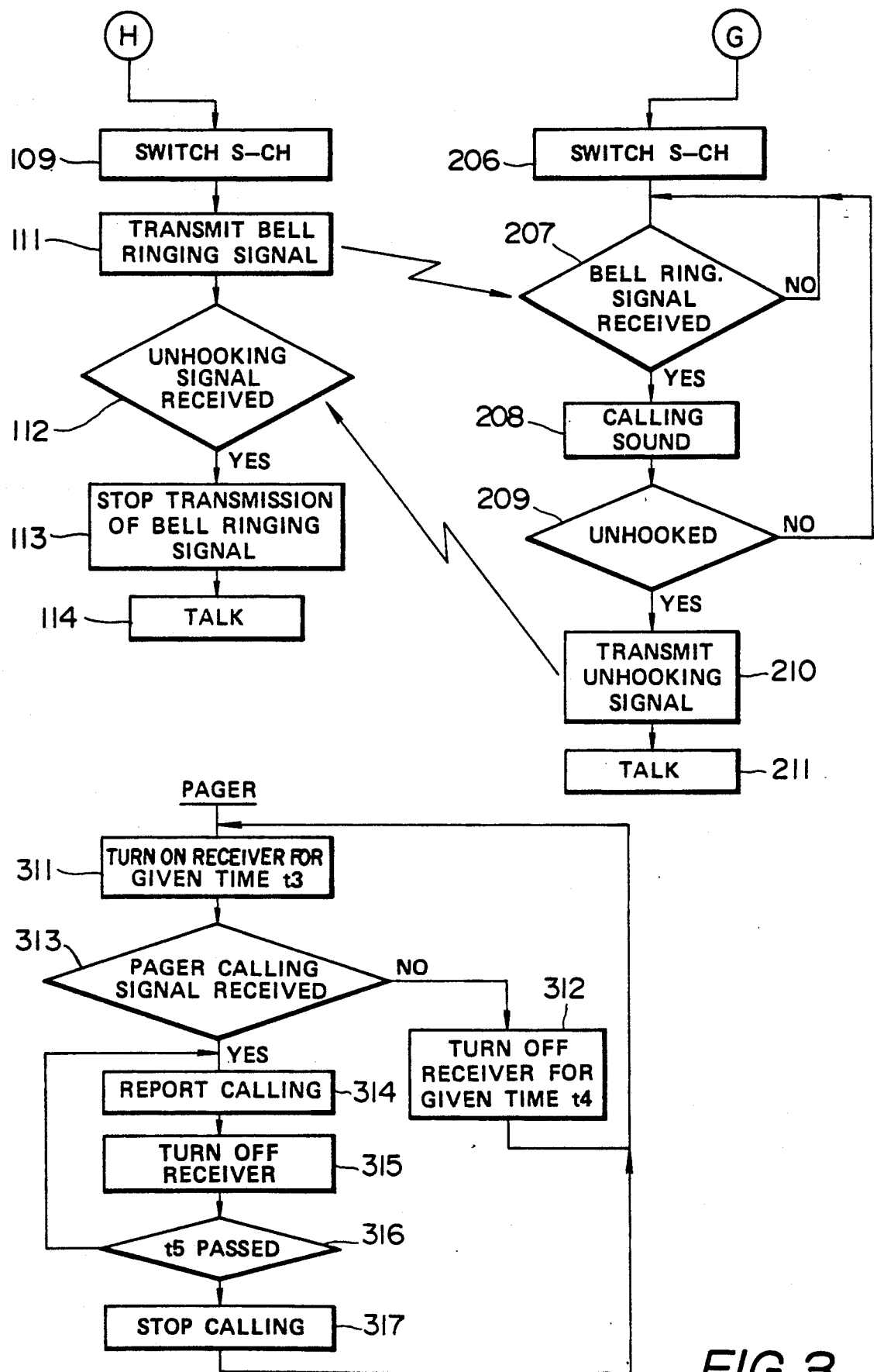

The flowchart of FIG. 3 shows another control process at the apparatus of the embodiment shown in FIG. 1. In this flowchart, when the parent device 1 does not receive a response indicative of reception from the radio telephone 2 even if it transmits the incoming signal, it transmits a pager calling signal to the pager 31.

Namely, when the frequency of transmitting the incoming signal reaches n (step 105), the control circuit 5 in the parent device 1 causes the transmission of the incoming signal to be stopped If at this time the parent device continues to receive the calling signal (step 106), the control circuit causes the pager transmitter 32 to transmit the pager calling signal via the pager transmission antenna 33 (step 115). When a preset time 2·t3+t4 has passed (step 116), the control circuit 5 causes the transmission of the pager calling signal to be stopped (step 117) and causes the sounder 90 in the parent device 1 to ring (step 107).

On the other hand, in order to save the battery, at the pager 31 the receiver 34 is turned on for a time t3 (step 311) and then turned off for a time t4 (step 312), which is repeated. The on-off period of the receiver 31 is a time t3+t4, so that it is a time t3 shorter than the transmission time 2·t3+t4 of the pager calling signal transmitted from the parent device 1 and, therefore, the pager calling signal is received reliably. When the receiver 34 is on and receives this pager calling signal via the reception antenna 35 (step 313), it applies the pager calling signal to the control circuit 36 which, in response to this signal, rings the sounder 37 as well as flashes the light emitting diode 38 to thereby report the calling from the parent device 1 (step 314). In order to save the battery, the control circuit 36 turns off the receiver 34 (step 315), and when a preset time t5 has passed (step 316), the control circuit causes the ringing of the sounder 37 and the flashing of the diode 38 to be stopped thereby to stop the reporting of the calling (step 313).

Therefore, if the user turns off the power source of the radio telephone 2 and carries the pager 31 around when he leaves the radio telephone 2, the battery of the radio telephone 2 is saved and calling can be noticed by the reporting from the pager 31.

Figure 4:
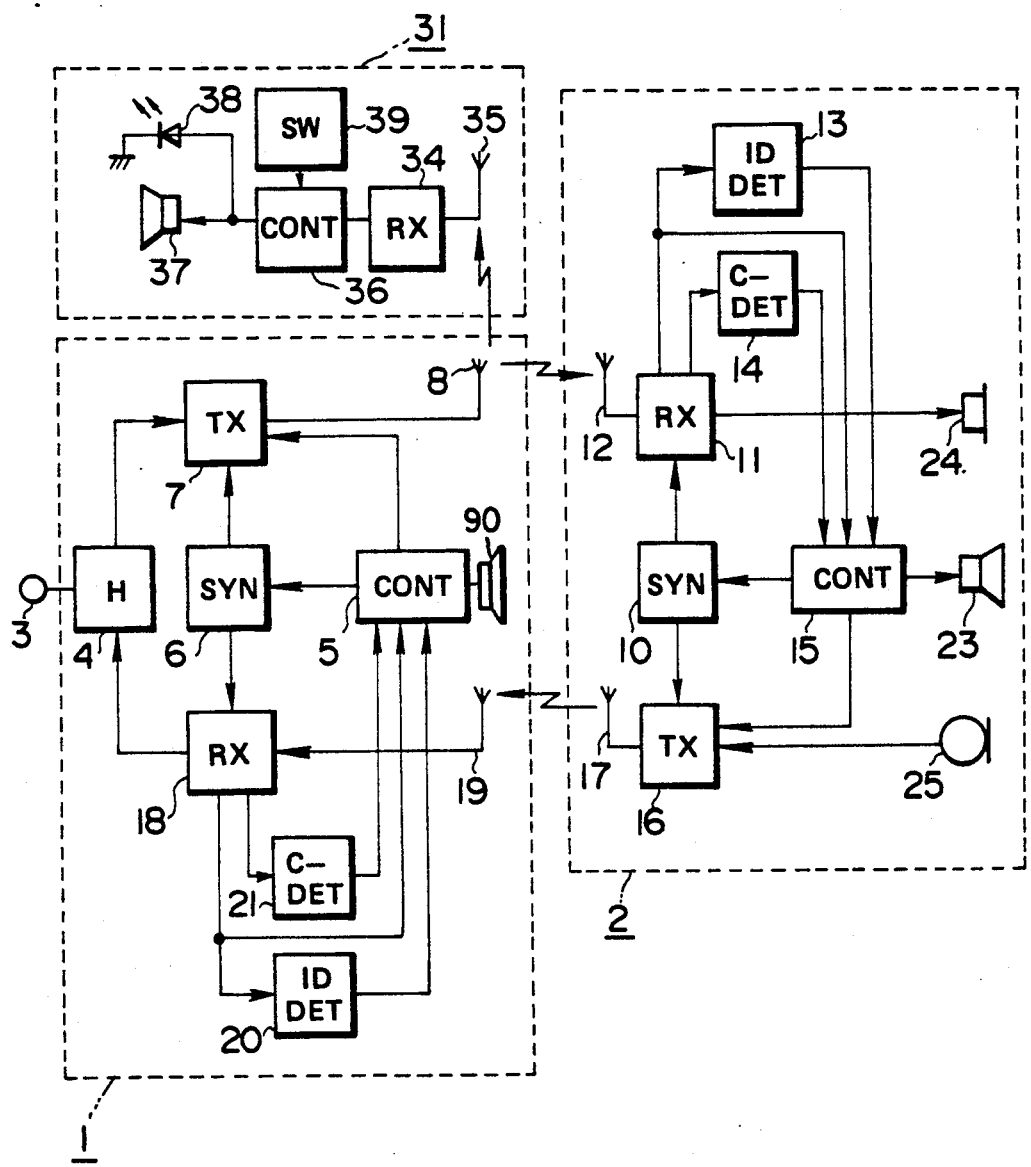
FIG. 4 is a block diagram showing a second embodiment of the cordless telephone apparatus according to this invention.
Figure 13:
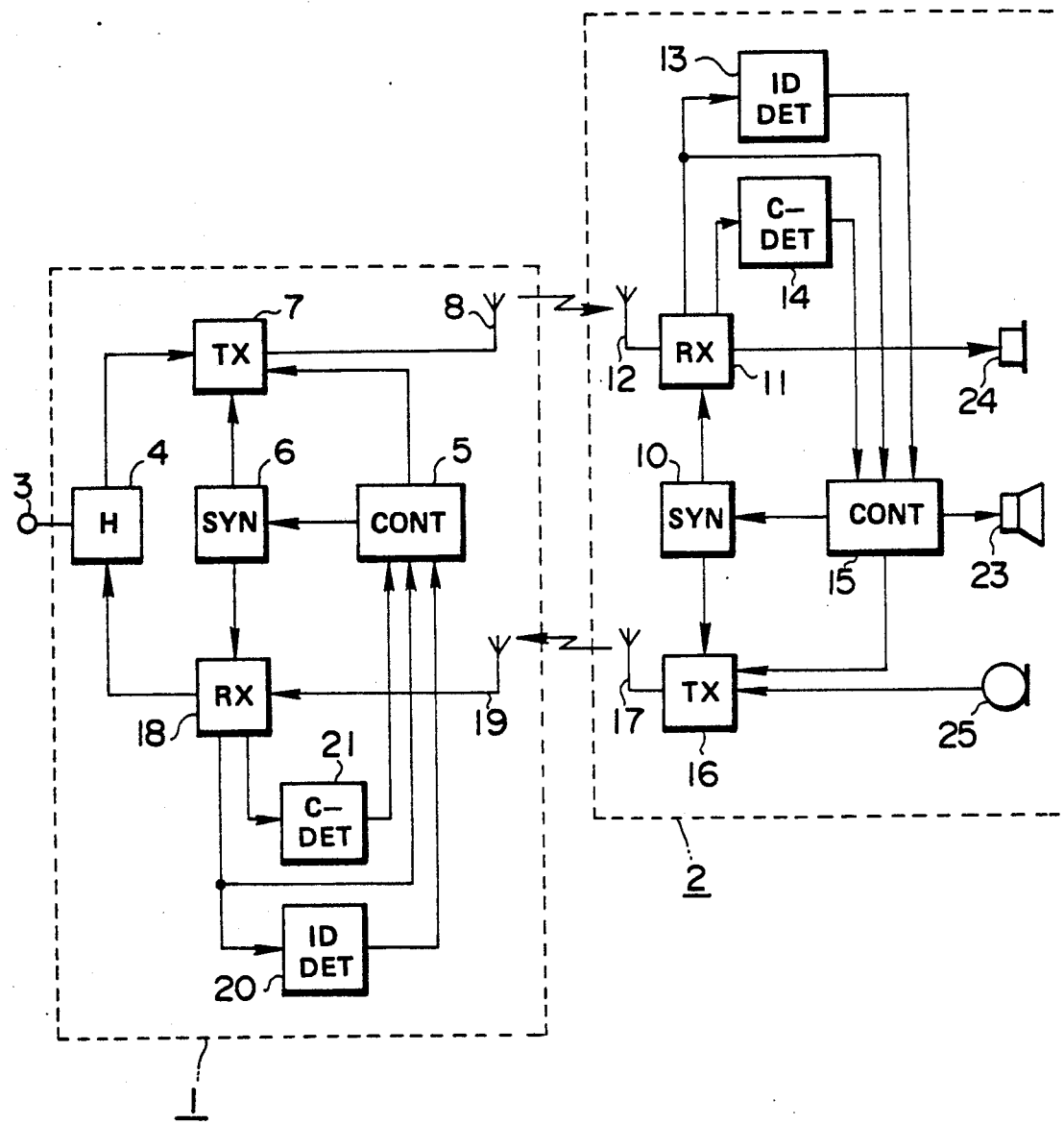
FIG. 13 is a block diagram showing a conventional cordless telephone apparatus.
Figure 14:
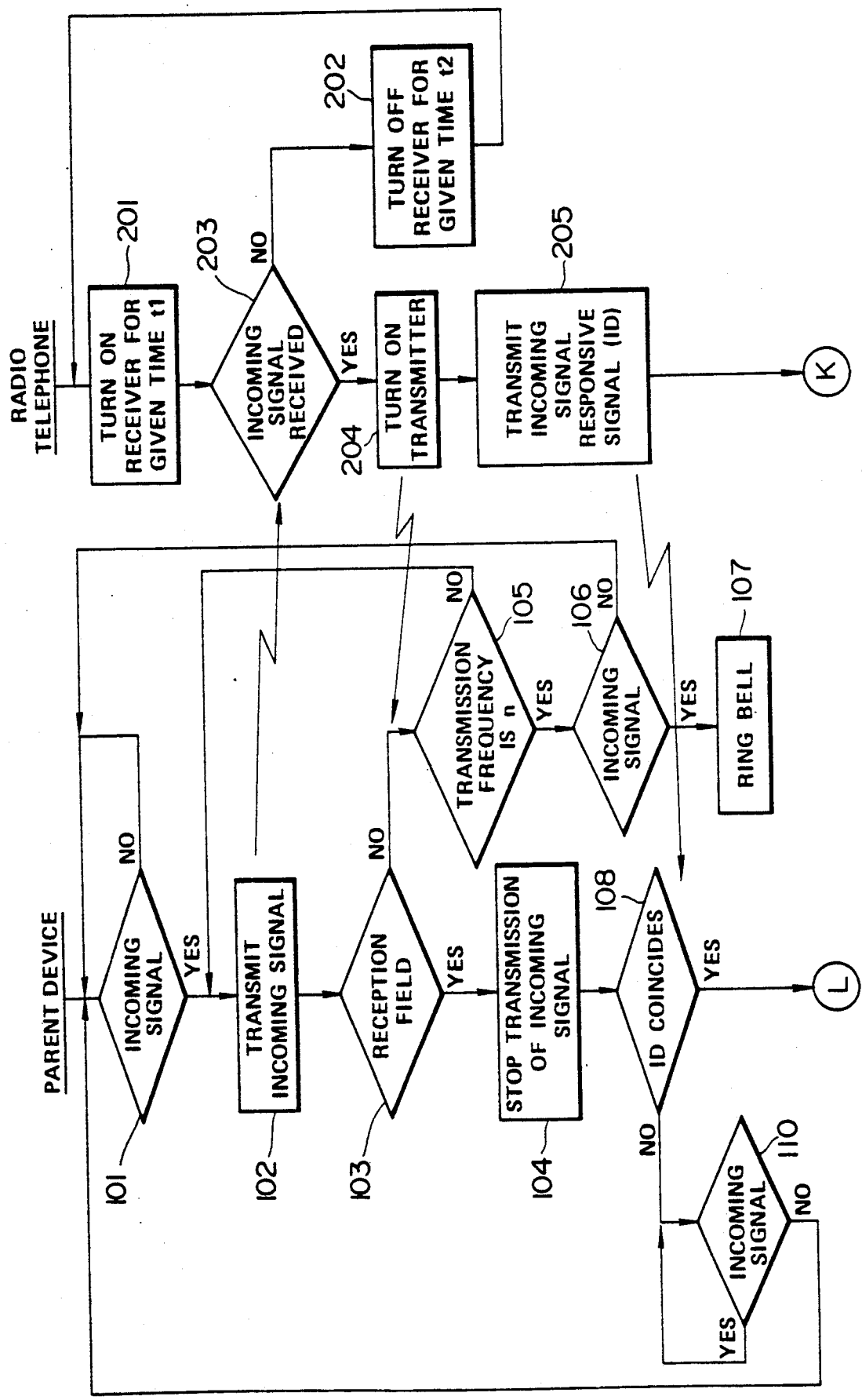
FIG. 14 is a flowchart showing the control process at the conventional apparatus shown in FIG. 13.
Figure 14:
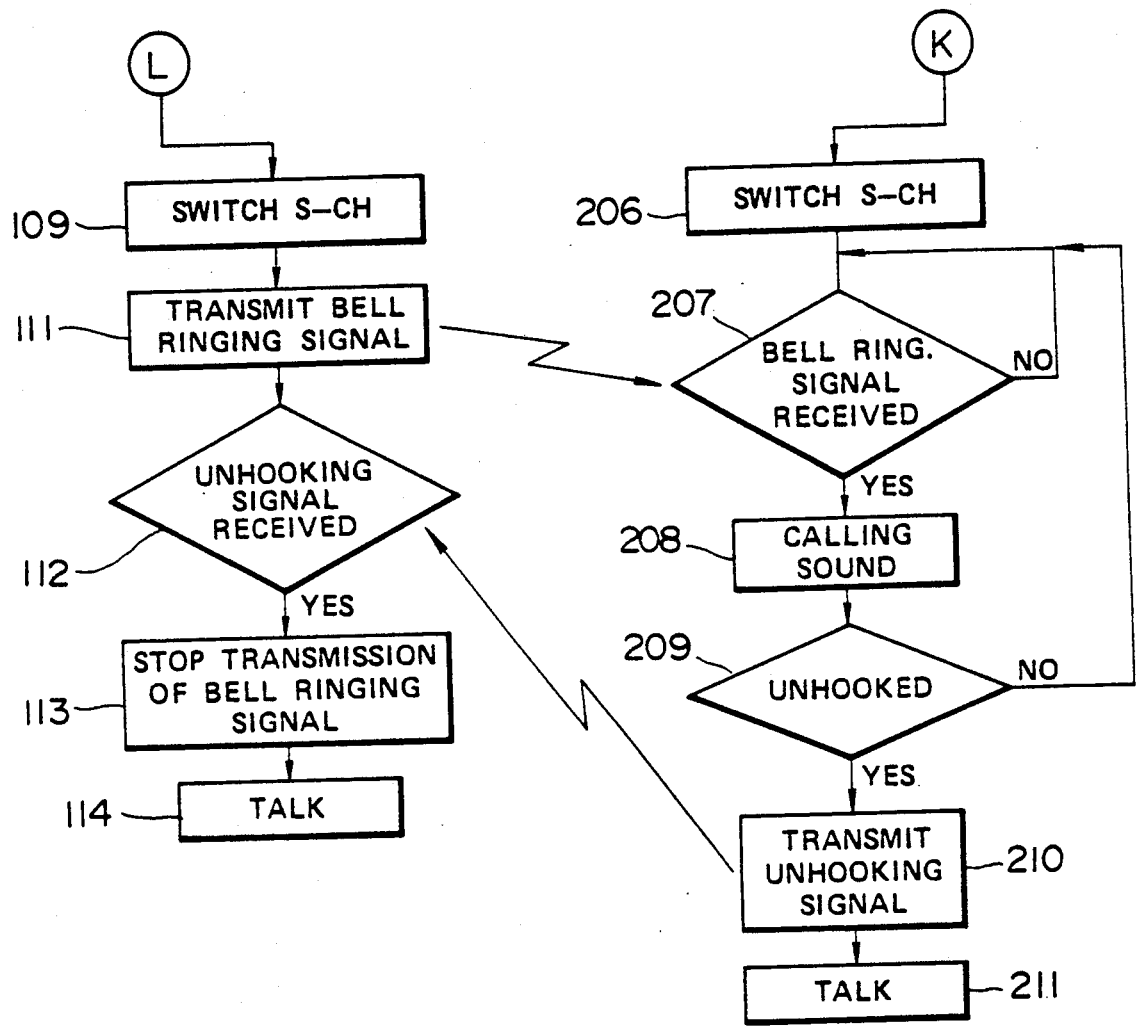

FIG. 4 is a block diagram showing a second embodiment of the cordless telephone apparatus according to this invention This invention includes the conventional apparatus shown in FIG. 13 and a pager 31.

Figure 5:
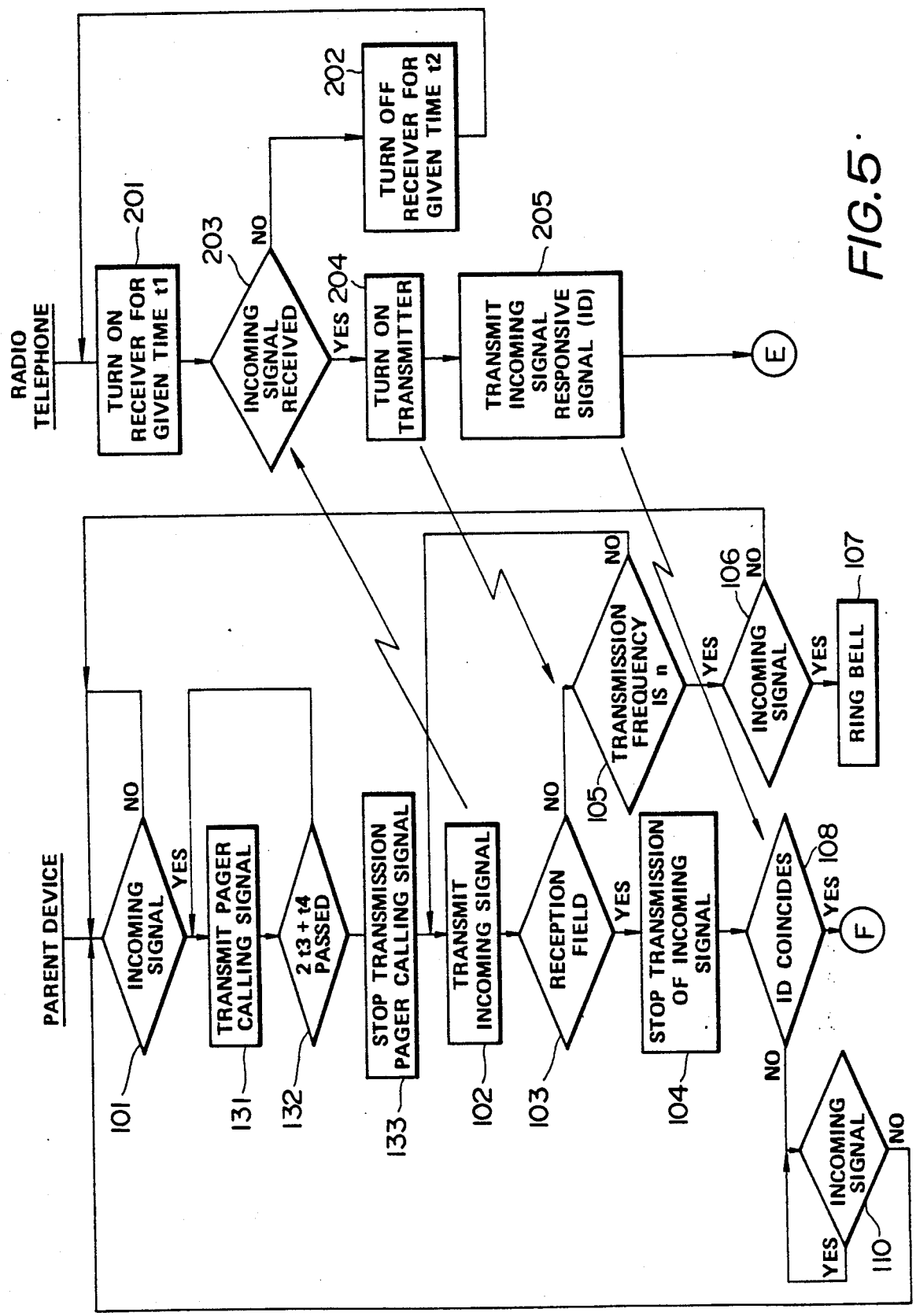
FIG. 5 is a flowchart showing the control process at the apparatus showing in FIG. 4.
Figure 5:
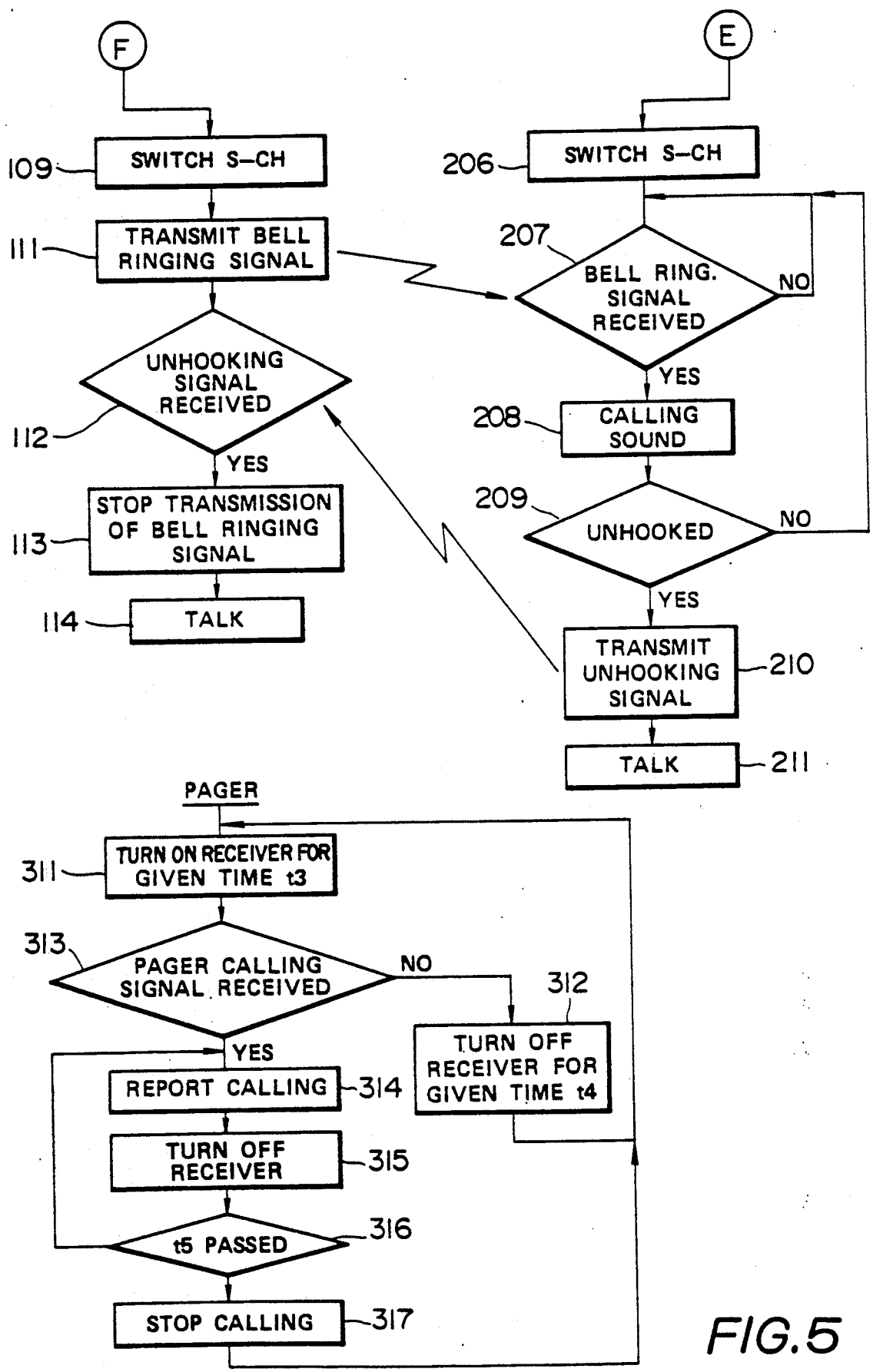

When there is an incoming signal and the apparatus receives a calling signal via the telephone circuit 3, the apparatus provides the control shown in the flowchart of FIG. 5. When the control circuit 5 in the parent device 1 determines that there is an incoming signal (step 101), it sets the synthesizer 6 at the frequency of the pager channel set in advance and then applies a pager calling signal to the transmitter 7 which, in response to this signal, transmits this signal via the pager channel and the transmission antenna 8 (step 131). The control circuit 5 then waits until the time t3+t4 has passed (step 132). When this time has passed, the control circuit causes the transmission of the pager calling signal to be stopped (step 133). Thereafter, the control circuit 5 switches the synthesizer 6 from the frequency of the pager channel to the frequency of the control channel to thereby cause the incoming signal to be transmitted (step 102).

On the other hand, in order to save the battery, at the pager 31 the receiver 34 is turned on for a time t3 (step 311) and then turned off for a time t4 (step 312), which is repeated. The receiver 34 is set in advance in the pager channel, and when it is on and receives the pager calling signal via the reception antenna 35 (step 313), it applies this signal &o the control circuit 36 which, in response to this signal, causes the sounder 37 to ring as well as to flash the light emitting diode 38 to thereby cause the calling from the parent device 1 to be reported (step 314). In order to save the battery, the control circuit 36 turns off the receiver 34 (step 315), and when a time t5 has passed (step 316), the control circuit 36 causes the ringing of the sounder 37 and the flashing of the diode 38 to be stopped thereby stop the reporting of the calling (step 317).

As just described, this embodiment lacks elements such as the pager transmitter 32 and pager transmission antenna 33 of the parent device 1 shown in FIG. 1, so that the structure of the parent device 1 is less complicated. Although the incoming signal is transmitted by the parent device 1 after the transmission time 2·t3+t4 of the pager calling signal, there is substantially no problem if the on-off period t3+t4 of the receiver 34 at the pager 31 is selected short enough compared to the on-off period t1+t2 of the receiver 11 at the radio telephone 2. The pager 31 uses the receiver 34 having a signal channel without a synthesizer, so that power consumption is very low. In this connection, for example, the power consumption of the pager 31 is about 5 mA and that of the radio telephone 2 is about 50 mA. Therefore, even if t3/(t3+t4) is selected to be 10 times (t1+t2), the entire current consumption during standby is the same. A switch 39 is provided in the pager 31 for stopping the reporting so as to avoid unnecessary ringing of the sounder 37.

Figure 6:
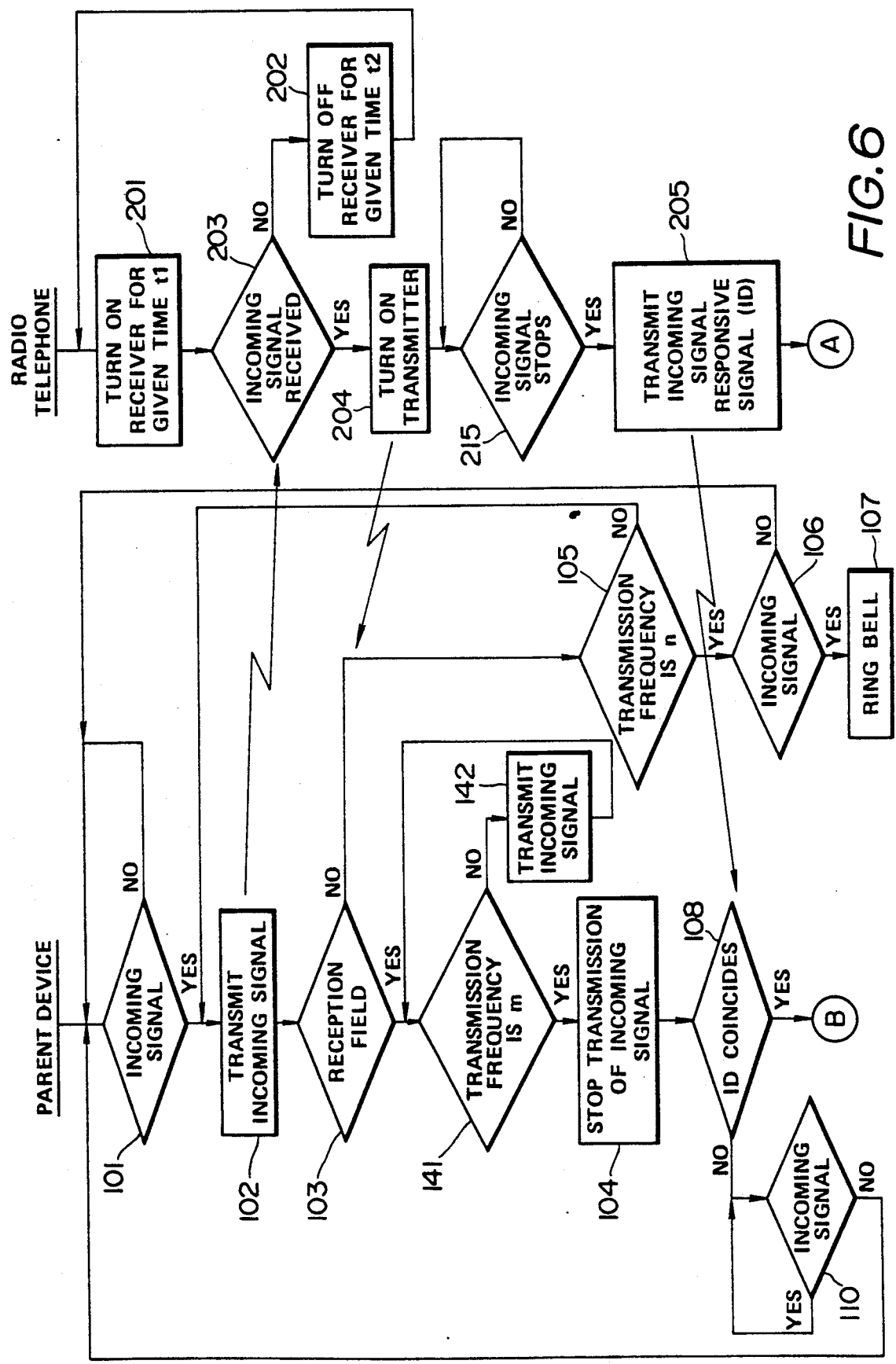
FIG. 6 is a flowchart showing another control process at the apparatus shown in FIG. 4.
Figure 6:
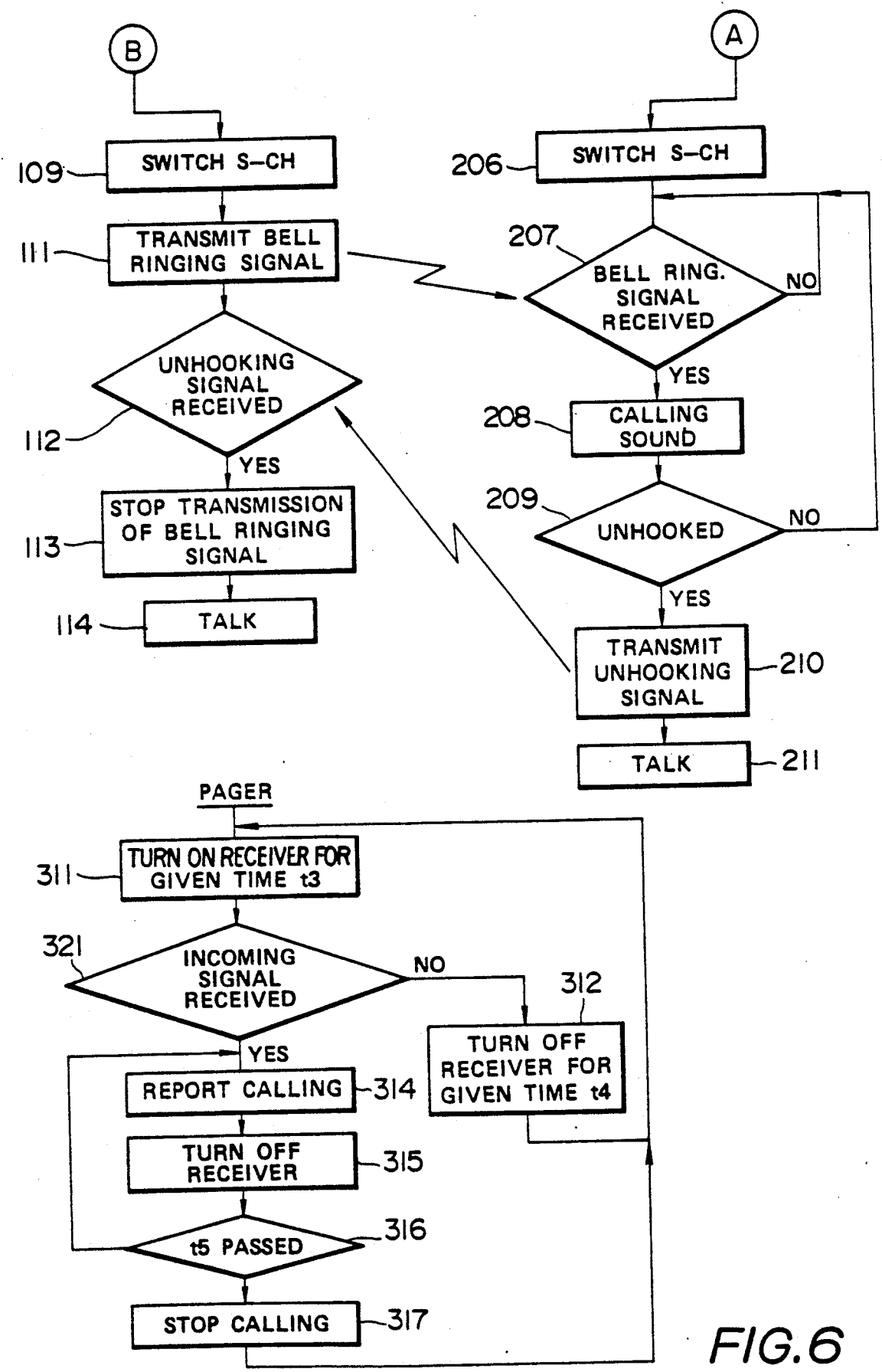

The flowchart of FIG. 6 illustrates another control process at the apparatus of the embodiment shown in FIG. 4. While the incoming signal has been transmitted delayed by the time 2·t3+t4 in the flowchart of FIG. 5, it is arranged that such does not occur in the flowchart of FIG. 6.

Namely, when the parent device 1 transmits the incoming signal via the control channel (step 102), it determines whether or not there is a reception field from the radio telephone 2 (step 103). If, for example, there is a reception field by transmitting an incoming signal only once, the parent device 1 determines whether or not the frequency of transmitting the incoming signal has reached m ($<n$) (step 141). Since the frequency has not reached m now, the incoming signal is again transmitted (step 142), which is repeated up to m times.

On the other hand, at the pager 31 the receiver 34 is turned on for a time t3 (311) and then turned off for a time t4 (step 312), which is repeated. The receiver 34 is set in advance to the control channel, receives the incoming signal during a period t3+t4 shorter than the time during which the incoming signal is transmitted m times (step 321), and applies this incoming signal to the control circuit 36 which, in response to this signal, rings the sounder 37 as well as flashes the diode 38 (step 314). The control circuit 36 then switches off the receiver 34 (step 315) and, after a time t5 has passed (step 316), the control circuit causes the ringing of the sounder 37 and the flashing of the diode 38 to be stopped (step 317).

When the radio telephone 2 receives the incoming signal (step 203), it turns on the transmitter 16 (step 204) and waits until the incoming signal is no longer received (step 215) after which the telephone 2 transmits a signal responsive to the incoming signal (step 205).

As just described, the pager 31 is started when it receives the incoming signal transmitted by the parent device 1, so that there is no delayed transmission of the incoming signal. It is to be noted that the control channel is not used for communication of a vocal signal, so that it may be of a narrow zone and hence the pager 31 can receive the incoming signal and reports it even if the pager 31 is distant from the parent device 1. In addition, it is unnecessary to allocate pager channels, so that it is possible to use electromagnetic waves effectively.

Figure 7:
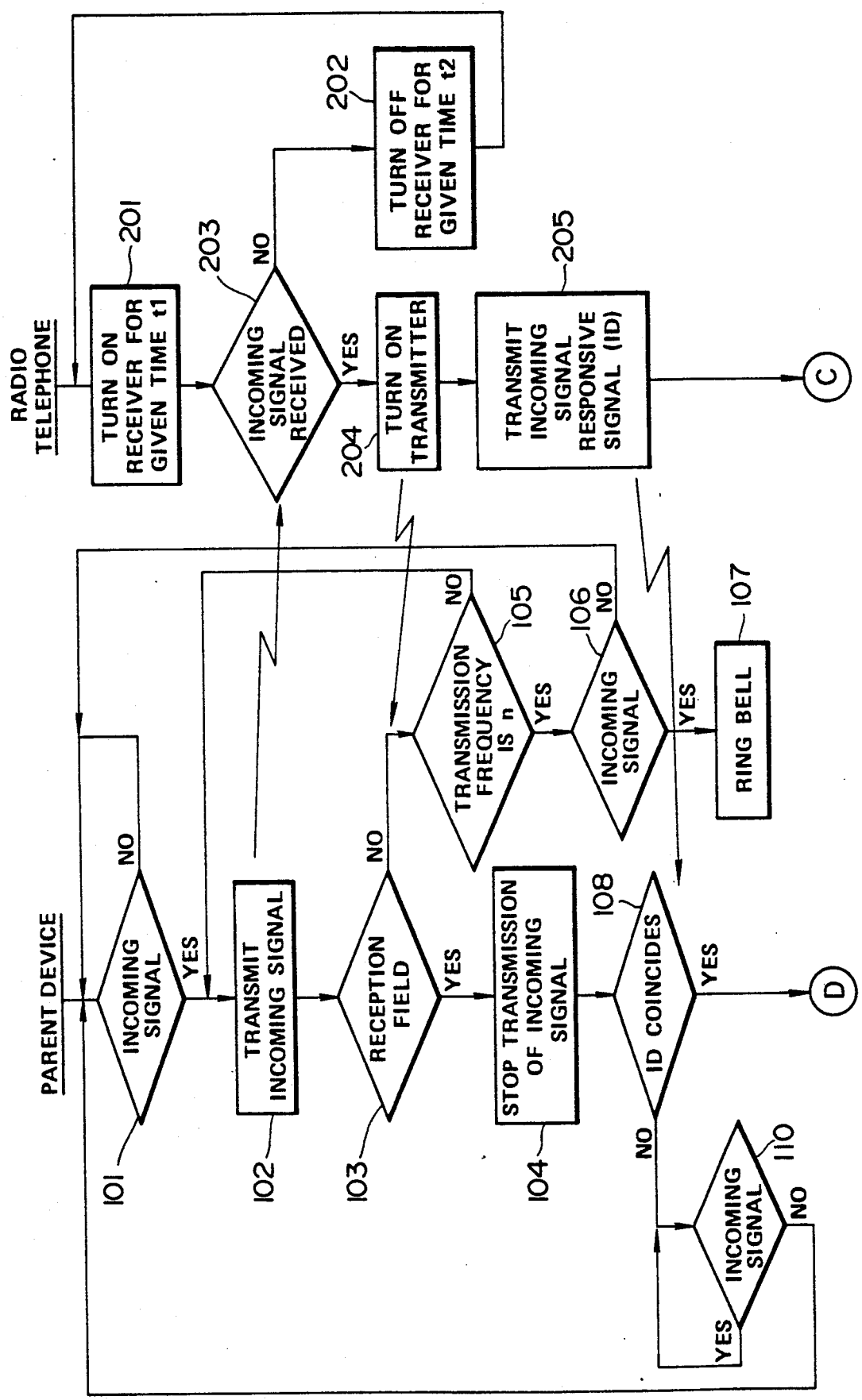
FIG. 7 is a flowchart showing another control process at the apparatus showing in FIG. 4.
Figure 7:
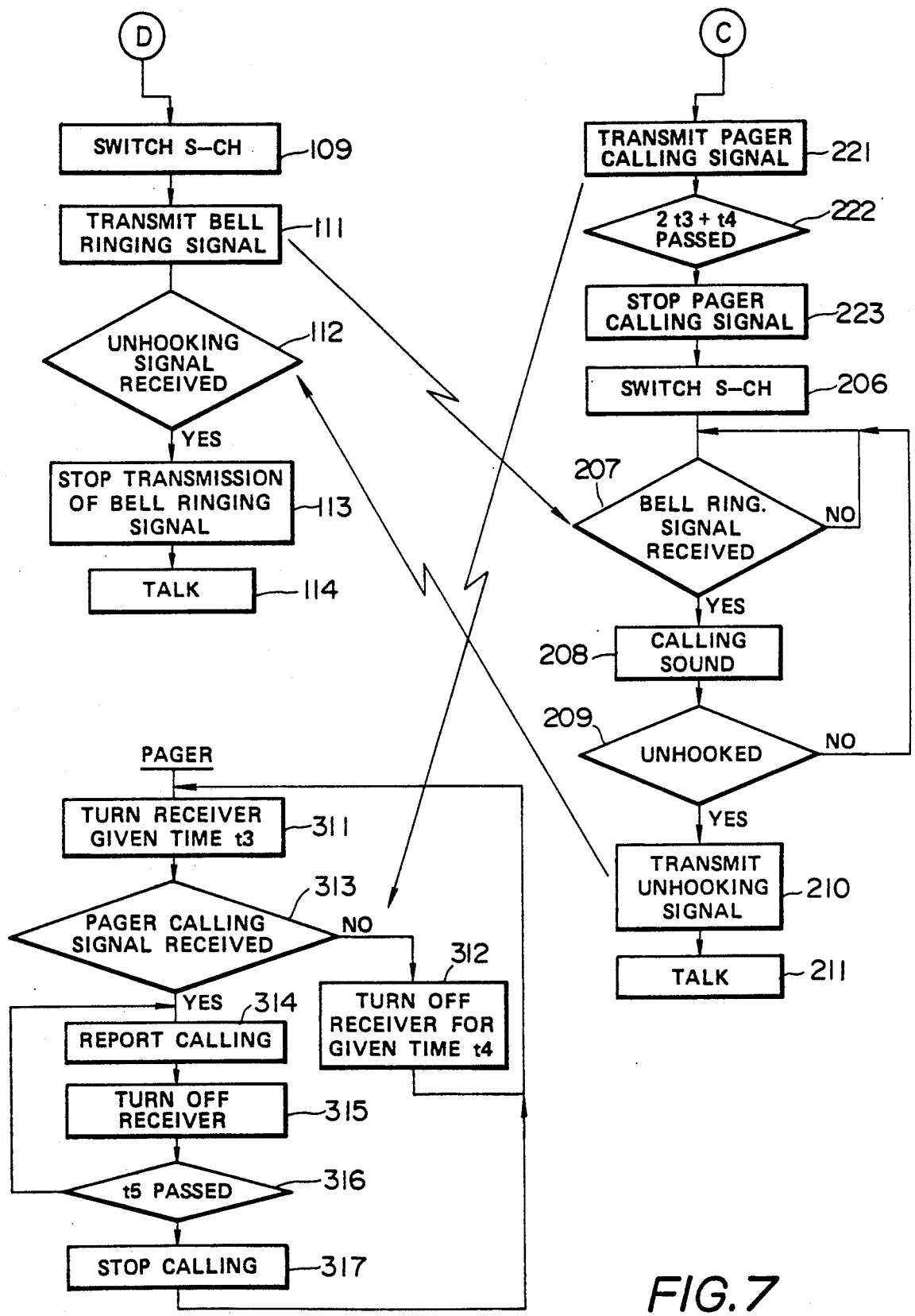

The flowchart of FIG. 7 illustrates another control process at the apparatus of the embodiment showing in FIG. 4. When the radio telephone 2 receives an incoming signal from the parent device 1 and transmits this signal, it transmits a pager calling signal to the pager 31.

Namely, when the radio telephone 2 transmits a signal responsive to an incoming signal (step 205), the control circuit 15 transmits a pager calling signal from the transmitter 16 via the transmission antenna 17 (step 221). When a preset time 2·t3+t4 has passed (step 222), the control circuit 15 causes the transmission of the pager calling signal to be stopped (step 223) and switches the synthesizer 10 from the frequency of the control channel to the frequency of the telephonic communication channel (step 206).

On the other hand, when the receiver 34 in the pager 31 is on and receives the pager calling signal (step 313), it applies the pager calling signal to the control circuit 36 which, in response to this signal, rings the sounder 37 as well as flashes the light emitting diode 38 (step 314). The control circuit 36 then turns off the receiver 34 (step 315) and when a time t5 has passed (step 316), the control circuit 36 causes the ringing of the sounder 37 and the flashing of the diode 38 to be stopped (step 317).

The standby period t1+t2 and t3+t4 in the radio telephone and the pager, respectively, described with reference to the flowcharts of FIGS. 2, 3, 5, 6 and 7 may not be fixed. For example, if the circumference of the radio telephone and pager is dark, namely, if there is no person around them, the radio telephone and pager may have a function to extend their respective periods.

Figure 8:
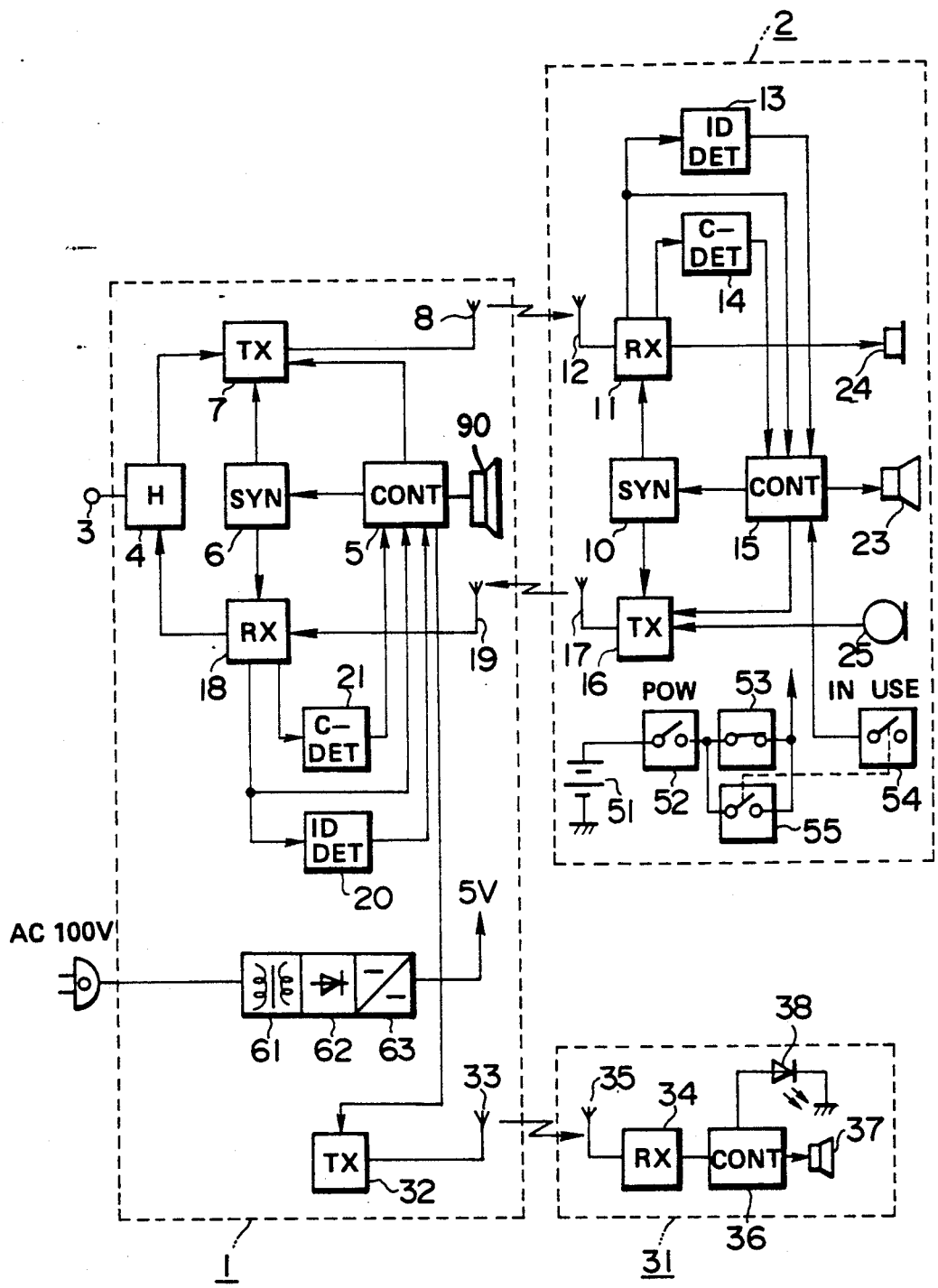
FIG. 8 is a block diagram showing a third embodiment of a cordless telephone apparatus according to this invention.

FIG. 8 is a block diagram showing a third embodiment of a cordless telephone apparatus according to this invention. In this embodiment, a microswitch 53 (normally open) is connected in series with a manual switch 52 which connects and disconnects the power source 51 of the radio telephone 2, and also connected in parallel with a switch 55 which interlocks with a manual switch 54.

Figure 9:
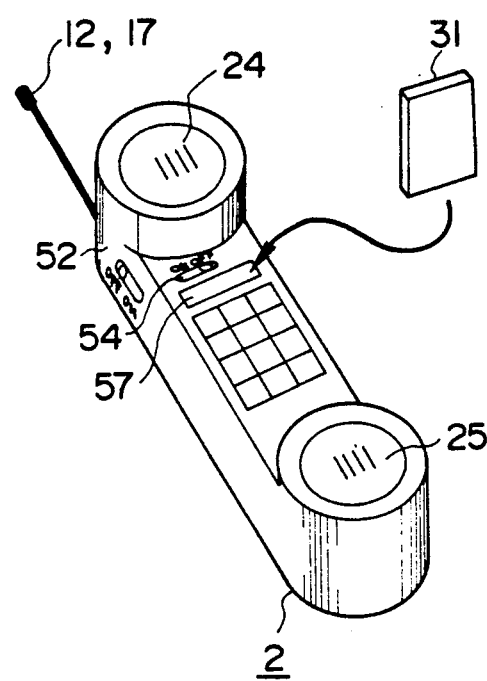
FIG. 9 is a perspective view showing a radio telephone in the apparatus shown in FIG. 8.

If the switch 52 is now switched on, the power source 51 supplies power via the switches 52 and 53. Here, if the pager 31 is inserted into a hole 57 in the radio telephone 2 as shown in FIG. 9, the microswitch 53 is switched off to stop power supply from the power source 51. Even if at this time the control shown in the flowchart of FIGS. 2, 3, 5 and 6 is provided, the radio telephone 2 will not operate and only the pager 31 will operate. Since the radio telephone 2 has the pager 31 mounted thereon, the pager 31 can report a call from the parent device 1 even when there is an incoming signal if the radio telephone 2 does not operate. When the pager 31 reports the call, the manual switch 54 may be switched on to switch on the switch 55 to thereby start to supply power to the telephone 2 for operating purposes.

Thus under the condition in which the radio telephone 2 has mounted the pager 31 thereon, the telephone 2 consumes no power and, as described above, the current consumption by the pager 31 is very small, so that the battery of the entire apparatus is saved effectively. When the user leaves the telephone 2 and carries pager 31 around, the telephone 2 and pager 31 operate and both report a call, so that the range of call reporting is expanded. It is to be noted that at the parent device 1, a DC voltage power supply circuit including a transformer 61, a rectifier 62 and a regulator 63 converts a commercially available AC voltage of 100 V to a direct current voltage of 5 V which is then fed, so that it is unnecessary to especially save the battery.

Figure 10:
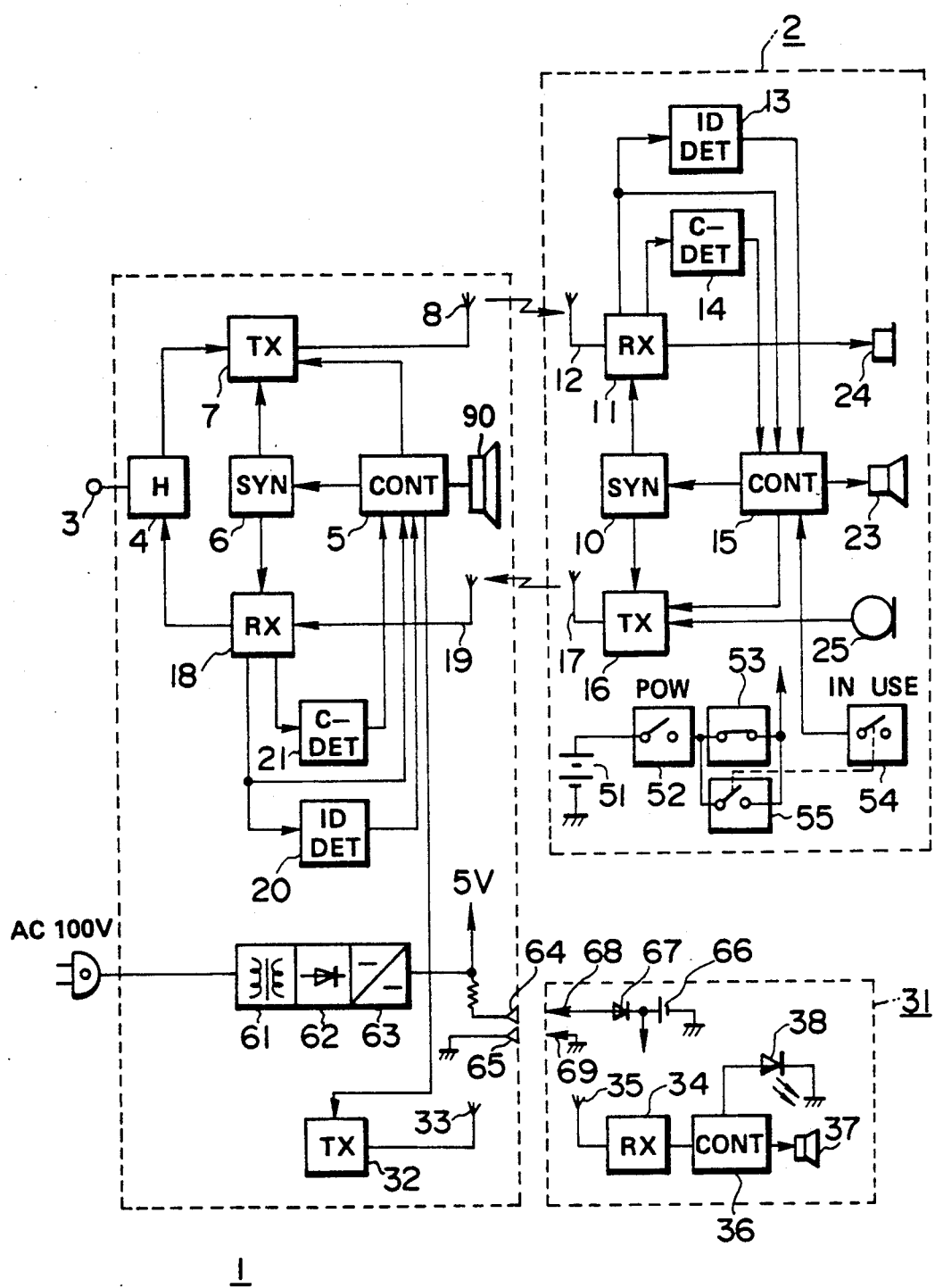
FIG. 10 is a block diagram showing a fourth embodiment of the cordless telephone apparatus according to this invention.

FIG. 10 is a block diagram showing a fourth embodiment of a cordless telephone apparatus according to this invention. The parent device 1 of this embodiment includes a direct current voltage supply circuit which in turn includes transformer 61, rectifier 62 and regulator 63 and an external terminal 64 to which the direct current voltage output from the direct current voltage supply circuit is applied, and an external terminal 65 at ground potential. The pager 31 includes a secondary battery 66 as a power supply, a diode 67 for preventing a reverse current, an external terminal 68 connected via the diode 67 to the secondary battery 66 and an external terminal 69 at ground potential.

If the pager 31 is mounted on the parent device 1 and the external terminals 68 and 69 of the pager 31 are connected to the external terminals 64 and 65 of the parent device 1, the direct current voltage output from the direct current voltage supply circuit is supplied via the external terminals 64, 68 and diode 67 to the secondary battery 66 to charge same. Therefore, the battery 66 is easily charged, so that the small-sized secondary battery may be used to miniatuarize the pager 31 easily. If the secondary battery 66 is miniaturized, the charging current is small, so that when the pager 31 is mounted on the radio telephone 2 in the embodiment shown in FIG. 8, the secondary battery 66 may be connected to the power source of the radio telephone 2 for charging purposes. Instead of the secondary battery 66, a solar cell may be used.

Figure 11:
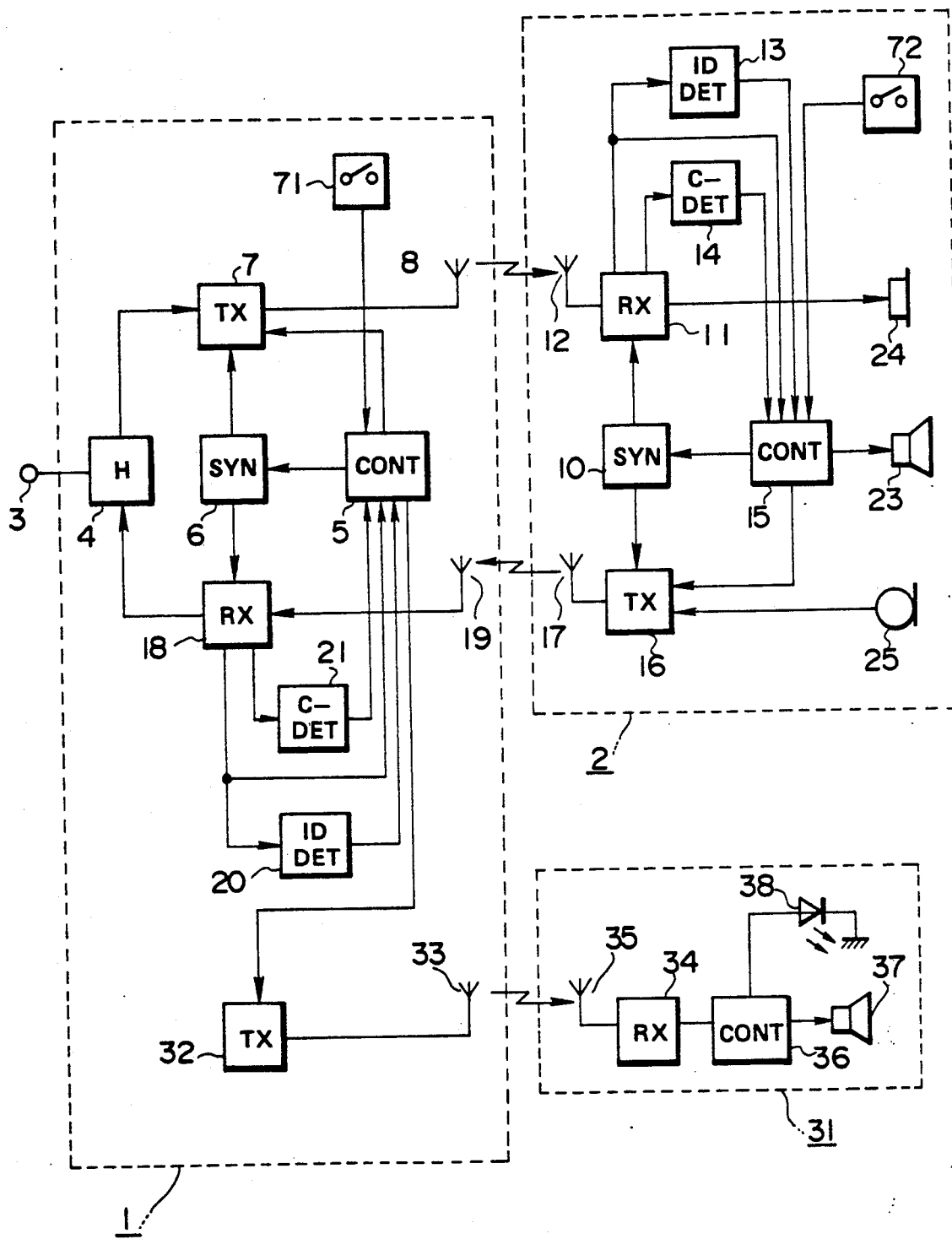
FIG. 11 is a block diagram showing a fifth embodiment of the cordless telephone apparatus according to this invention.
Figure 12:
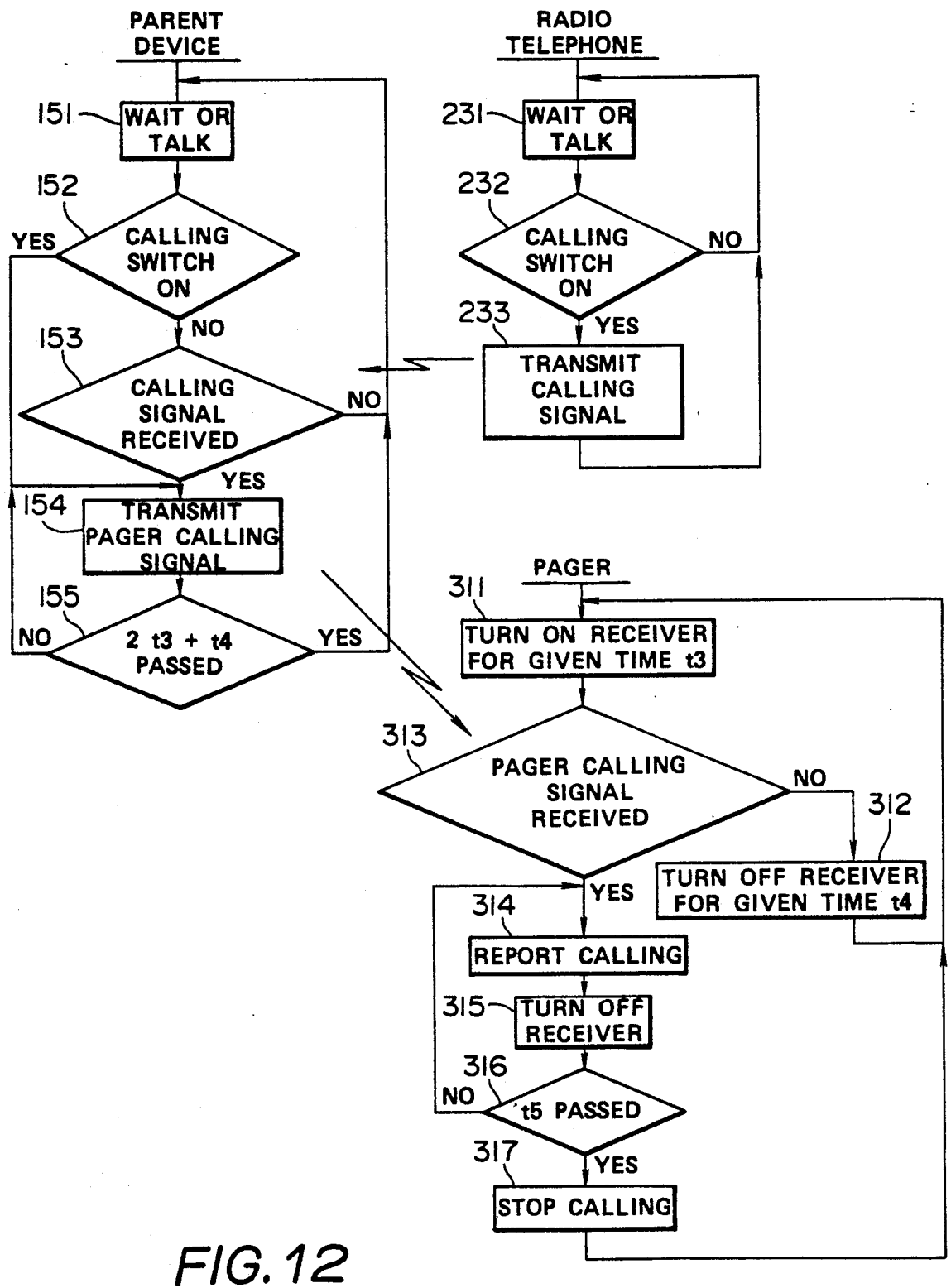
FIG. 12 is a flowchart showing the control process at the apparatus shown in FIG. 11.

FIG. 11 shows a block diagram showing a fifth embodiment of the cordless telephone apparatus according to this invention. In this embodiment, the parent device 1 includes the parent device 1 shown in FIG. 1 and a pager calling switch 71 provided thereon while radio telephone 2 includes the telephone 2 and a pager calling switch 72 provided thereon. This embodiment provides the control shown in the flowchart of FIG. 12.

First, when the telephone 2 is waiting an incoming signal from the parent device 1 or in telephonic communication (step 231) and the pager calling switch 72 is switched on (step 232), the control circuit 15 causes the transmitter 16 to transmit a pager calling signal via the transmission antenna 17 (step 233). When the parent device 1 is waiting for a calling signal from the subscriber's line 3 or in telephonic communication (step 151) and when the pager calling switch 71 is switched on (step 152) or the receiver 18 receives via reception antenna 19 the pager calling signal transmitted by the radio telephone 2 (step 153), the control circuit 5 causes the pager transmitter 32 to transmit a pager calling signal via the pager transmission antenna 33 (step 154) and causes this transmission to be stopped after a time 2 t3+t4 has passed (step 155).

On the other hand, when the pager 31 receives the pager calling signal at the receiver 34 via the antenna 35 (step 313), the control circuit 36 causes the sounder 37 to ring and causes the light emitting diode 38 to flash (step 314) and when a time t5 has passed (step 316), the control circuit 36 causes the sounder 37 and diode 38 to stop their ringing and flashing, respectively, (step 317).

Therefore, when the user carries the pager 31 around, and switches on the pager calling switch 71 or 72, the pager 31 receives a call from the parent device 1 or the radio telephone 2. It would be convenient if the calling from the parent device 1 when there is an incoming signal, the calling from the radio telephone 2 by the switching on of the pager calling switch 72, and the calling from the parent device 1 by the switching on of the pager calling switch 71 can be discriminated one from the other using the reporting by the pager 31. To this end, pager calling signals indicative of these respective cases are predetermined. When the pager 31 receives these respective pager calling signals, the control circuit 36 discriminates the respective cases. For example, when there is an incoming signal and the pager 31 is called from the parent device 1, it causes the sounder 37 and diode 38 to operate for one second at intervals of one second. When the pager calling switch 72 is switched on and the pager 31 is called by the telephone 2, the control circuit 36 may cause the sounder 37 and diode 38 to operate continuously. In addition, when the pager calling switch 71 is switched on and the pager 31 is called from the parent device 1, the control circuit 36 may cause the light emitting diode 38 to operate for 0.5 seconds at intervals of 0.5 seconds. Thus, the above respective cases can be discriminated on the basis of the reporting by the pager 31. The pager 31 may have a liquid crystal display which displays the above respective cases thereon using characters and continues such display for a predetermined set time after the reporting is completed, which further facilitates the discrimination.

What is claimed is:

1. A cordless telephone apparatus comprising:
   a parent device connected to a telephone line;
   a radio telephone set connectable through a radio circuit with the parent device; and
   a pager for reporting the reception of a calling signal;
   the parent device including,
   a first transmitter for transmitting a signal to the radio telephone set;
   a first receiver for receiving a signal from the radio telephone set;
   a second transmitter for transmitting a signal to the pager;
   means for establishing a radio circuit between the radio telephone set and the parent device by controlling the first transmitter and the first receiver;
   transmitting means, when receiving an incoming signal from the telephone line, for transmitting the incoming signal from the first transmitter to the radio telephone set and at the same time for transmitting a pager calling signal from the second transmitter to the paper; and
   means for terminating the transmission of the pager calling signal from the second transmitter in response to reception of an off-hook signal generated through an off-hook operation of the radio telephone set;
   the radio telephone set including,
   a second receiver for receiving the signal from the first transmitter of the parent device; and
   a third transmitter for transmitting the signal to the first receiver of the parent device;
   the pager including,
   a third receiver for receiving the signal from the second transmitter of the parent device; and
   means for reporting the reception of the incoming signal in response to reception of the pager calling signal from the second transmitter of the parent device at the third receiver.

2. A cordless telephone apparatus as set forth in claim 1, wherein the transmitting means transmits the pager calling signal from the second transmitter of the parent device through a pager-only channel and a signal reception channel of the third receiver of the pager is fixedly set at a pager-only channel.

3. A cordless telephone apparatus as set forth in claim 1, wherein the third receiver of the pager intermittently receives the pager calling signal from the second transmitter of the parent device.

4. A cordless telephone apparatus as set forth in claim 1, wherein the parent device includes a means for reporting the reception of the incoming signal from the telephone line when, even after the transmission of the incoming signal from the first transmitter to the radio telephone set a predetermined number of times, the third transmitter of the radio telephone set does not answer it.

5. A cordless telephone apparatus as set forth in claim 1, wherein the parent device further includes means, when an identification code contained in an incoming signal answering signal received from the radio telephone set coincides with a preset identification code, for transmitting a bell ringing signal to the radio telephone set, and the radio telephone set further includes means for generating a bell ringing sound to report the reception of the incoming signal in response to reception of the bell ringing signal.

6. A cordless telephone apparatus as set forth in claim 1, wherein the pager includes a secondary battery as a power source thereof and is removably mounted to the parent device or the radio telephone set, the secondary battery being charged with power supplied from the parent device and radio telephone set when the pager is mounted thereto.

7. A cordless telephone apparatus as set forth in claim 1, wherein the parent device and the radio telephone set further includes switch means for starting the pager, and the radio telephone set further includes means for transmitting to the pager a signal instructing the reporting means to start by operating the switch means.

8. A cordless telephone apparatus as set forth in claim 4, wherein the reporting means of the parent device reports in a first manner when receiving the pager calling signal transmitted from the second transmitter of the parent device based on the reception of the incoming signal from the telephone line.

9. A cordless telephone apparatus comprising:
   a parent device connected to a telephone line;
   a radio telephone set connectable through a radio circuit with the parent device; and
   a pager for reporting the reception of a calling signal;
   the parent device including,
   a first transmitter for transmitting a signal to the radio telephone set;
   a first receiver for receiving a signal from the radio telephone set;
   a second transmitter for transmitting a signal to the pager;
   means for establishing a radio circuit between the radio telephone set and the parent device by controlling the first transmitter and the first receiver;
   first transmitting means, when receiving an incoming signal from the telephone line, for transmitting the incoming signal from the first transmitter of the parent device to the radio telephone set; and
   second transmitting means, when the first transmitting means has transmitted the incoming signal from the first transmitter of the parent device to the radio telephone set but there is no answer to the reception of the incoming signal from the radio telephone set, for transmitting a pager calling signal from the second transmitter of the parent device to the pager for a predetermined period of time;
   the radio telephone set including,
   a second receiver for receiving the signal from the first transmitter of the parent device; and a third transmitter for transmitting the signal to the first receiver of the parent device;

the pager including, a third receiver for receiving the signal from the second transmitter of the parent device; and means for reporting the reception of the incoming signal in response to reception of the pager calling signal from the second transmitter of the parent device at the third receiver.

10. A cordless telephone apparatus as set forth in claim 9, wherein the second transmitting means transmits the pager calling signal from the second transmitter of the parent device through a pager-only channel and a signal reception channel of the third receiver of the pager is fixedly set at a pager-only channel.

11. A cordless telephone apparatus as set forth in claim 9, wherein the third receiver of the pager receives the pager calling signal from the second transmitter of the parent device during a reception period of the third receiver that is shorter than the predetermined time period during which the second transmitter of the parent device transmits the pager calling signal.

12. A cordless telephone apparatus as set forth in claim 9, wherein the pager further includes:

means for stopping signal receiving operation of the third receiver at the same time with start of a reporting operation of the reporting means; and means, when a predetermined period of time elapses from the start of the reporting operation of the reporting means, for stopping the reporting operation and again starting the signal receiving operation of the third receiver.

13. A cordless telephone apparatus as set forth in claim 9, wherein the second transmitting means of the parent device transmits the pager calling signal and the incoming signal continues from the telephone line either when the first transmitter of the parent device transmits the incoming signal a predetermined number of times to the radio telephone set but the third transmitter of the radio telephone set does not answer the reception of the incoming signal, or when an identification included in a received incoming-signal answering signal does not coincide with a present identification code.

14. A cordless telephone apparatus as set forth in claim 9, wherein the parent device further includes means, after transmitting the pager calling signal from the second transmitter, for reporting the signal reception on the side of the parent device.

15. A cordless telephone apparatus comprising:

a parent device connected to a telephone line;

a radio telephone set connectable through a radio circuit with the parent device; and a pager for reporting the reception of a calling signal;

the parent device including, a first transmitter for transmitting a signal to the radio telephone set and the pager;

a first receiver for receiving a signal from the radio telephone set;

means for establishing a radio circuit between the radio telephone set and the parent device by controlling the first transmitter and the first receiver;

first transmitting means for transmitting a pager calling signal from the first transmitter to the pager for a predetermined period of time in response to reception of an incoming signal from the telephone line; and second transmitting means, after the first transmitting means has transmitted the pager calling signal, for transmitting the incoming signal from the first transmitter to the radio telephone set;

the radio telephone set including, a second receiver for receiving the signal from the first transmitter of the parent device; and a second transmitter for transmitting the signal to the first receiver of the parent device;

the pager including, a third receiver for receiving the signal from the first transmitter from the parent device; and means for reporting the reception of the incoming signal in response to reception of the pager calling signal from the first transmitter of the parent device at the third receiver, and wherein the first transmitting means transmits the pager calling signal from the fist transmitter of the parent device through a pager-only channel and a signal reception channel of the third receiver of the pager is fixedly set at the pager-only channel; and wherein the third receiver of the pager receives the pager calling signal from the parent device during a reception period of the third receiver that is shorter than the predetermined time period during which the first transmitter of the parent device transmits the pager calling signal.

16. A cordless telephone apparatus as set forth in claim 15, wherein the parent device further includes means for reporting the reception of the incoming signal from the telephone line when, even after the transmission of the incoming signal from the first transmitter of the parent device a predetermined number of times, the second transmitter of the radio telephone set does not answer it.

17. A cordless telephone apparatus comprising:

a parent device connected to a telephone line;

a radio telephone set connectable through a radio circuit with the parent device; and a pager for reporting the reception of a calling signal;

the parent device including, a first transmitter for transmitting a signal to the radio telephone set and the pager;

a first receiver for receiving a signal from the radio telephone set;

means for establishing a radio circuit between the radio telephone set and the parent device by controlling the first transmitter and the first receiver;

first transmitting means for transmitting a pager calling signal from the first transmitter to the pager for a predetermined period of time in response to reception of an incoming signal from the telephone line; and second transmitting means, after the first transmitting means has transmitted the pager calling signal, for transmitting the incoming signal from the first transmitter to the radio telephone set;

the radio telephone set including, a second receiver for receiving the signal from the first transmitter of the parent device; and a second transmitter for transmitting the signal to the first receiver of the parent device;

the pager including, a third receiver for receiving the signal from the first transmitter of the parent device; and means for reporting the reception of the incoming signal in response to reception of the pager calling signal from the first transmitter of the parent device; and wherein the second receiver of the radio telephone set intermittently receives the signal from the first transmitter of the parent device at a first period, the third receiver of the pager intermittently receives the signal from the first transmitter of the parent device at a second period, the second period being set shorter than the first period.

18. A cordless telephone apparatus comprising:
a parent device connected to a telephone line;
a radio telephone set connectable through a radio circuit with the parent device; and
a pager for reporting the reception of a calling signal;
the parent device comprising,
   a first transmitter for transmitting a signal to the radio telephone set and the pager;
   a first receiver for receiving the signal from the radio telephone set;
   means for establishing a radio circuit between the radio telephone set and the parent device by controlling the first transmitter and the first receiver; and
   means, when receiving an incoming signal from the telephone line, for transmitting the incoming signal from the first transmitter to the radio telephone set and the pager;
the radio telephone set including,
   a second receiver for receiving the signal from the first transmitter of the parent device; and
   a second transmitter for transmitting the signal to the first receiver of the parent device;
the pager including,
   a third receiver for receiving the signal from the first transmitter of the parent device; and
   means for reporting said reception of an incoming signal in response to reception of said incoming signal from the first transmitter of the parent device at the third receiver, and wherein
   the transmitting means transmits the incoming signal from the first transmitter from the parent device a predetermined number of times after the second transmitter of the radio telephone set answers the reception of the incoming signal; and
   the third receiver of the pager receives the pager calling signal from the parent device during a reception period of the third receiver that is shorter than the predetermined period of time during which the first transmitter of the parent device transmits the incoming signal.

19. A cordless telephone apparatus as set forth in claim 18, wherein the parent device further includes means for reporting the reception of the incoming signal when, even after the transmission of the incoming signal from the first transmitter a predetermined number of times, the third transmitter of the radio telephone set does not answer it.

20. A cordless telephone apparatus comprising:
a parent device connected to a telephone line;
a radio telephone set connectable through a radio circuit with the parent device; and
a pager for reporting the reception of a calling signal;
the parent device including,
   a first transmitter for transmitting a signal to the radio telephone set;
   a first receiver for receiving a signal from the radio telephone set;
   means for establishing a radio circuit between the radio telephone set and the parent device by controlling the first transmitter and the first receiver; and
   first transmitting means when receiving an incoming signal from the telephone line, for transmitting the incoming signal from the first transmitter to the radio telephone set;
the radio telephone set including,
   a second receiver for receiving the signal from the first transmitter of the parent device;
   a second transmitter for transmitting the signal to the first receiver of the parent device; and
   second transmitting means for transmitting a pager calling signal from the second transmitter to the pager in response to reception of the incoming signal from said first transmitter of the parent device;
the pager including,
   a third receiver for receiving the signal from the second transmitter of the radio telephone set; and
   means for reporting the reception of the incoming signal in response to reception of the pager calling signal from the second transmitter of the radio telephone set at the third receiver, wherein
   the third receiver of the pager receives the pager calling signal from the radio telephone set during a reception period of the third receiver that is shorter than the predetermined time period during which the second transmitter of the radio telephone set transmits the pager calling signal.

21. A cordless telephone apparatus as set forth in claim 20, wherein the parent device further includes means for reporting the reception of the incoming signal from the telephone line when, even after the transmission of the incoming signal from the first transmitter a predetermined number of times, the second transmitter of the radio telephone set does not answer it.

22. A cordless telephone apparatus set forth in claim 7, wherein the parent device includes a means for reporting in a first manner when receiving the pager calling signal transmitted from the second transmitter of the parent device based on the reception of the incoming signal from the telephone line and reports in a second manner when receiving the signal transmitted from the parent device and/or the radio telephone set based on the operation of the switch means.

* * * * *

UNITED STATES PATENT AND TRADEMARK OFFICE
CERTIFICATE OF CORRECTION

PATENT NO.  : 5,040,204
DATED       : August 13, 1991
INVENTOR(S) : Isao Sasaki et al.

It is certified that error appears in the above-identified patent and that said Letters Patent is hereby corrected as shown below:

Abstract, line 1, change "cordess" to --cordless--

Abstract, line 1, change "paper" to --pager--.

Claim 1, column 9, line 41, change "paper" to --pager--.

Claim 15, column 12, line 18, change "fist" to --first--.

Signed and Sealed this

Twenty-ninth Day of June, 1993

Attest:

MICHAEL K. KIRK

Attesting Officer

Acting Commissioner of Patents and Trademarks